(12) United States Patent
Ishiyama

(10) Patent No.: US 11,263,740 B2
(45) Date of Patent: Mar. 1, 2022

(54) INDIVIDUAL IDENTIFYING DEVICE

(71) Applicant: NEC Corporation, Tokyo (JP)

(72) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 203 days.

(21) Appl. No.: 16/343,486

(22) PCT Filed: Oct. 20, 2016

(86) PCT No.: PCT/JP2016/081136
§ 371 (c)(1),
(2) Date: Apr. 19, 2019

(87) PCT Pub. No.: WO2018/073938
PCT Pub. Date: Apr. 26, 2018

(65) Prior Publication Data
US 2019/0266714 A1    Aug. 29, 2019

(51) Int. Cl.
*G06T 7/00* (2017.01)
*B41J 2/04* (2006.01)
*G06K 9/46* (2006.01)
*B41J 2/015* (2006.01)
*G06K 9/62* (2022.01)

(52) U.S. Cl.
CPC ............... *G06T 7/001* (2013.01); *B41J 2/015* (2013.01); *B41J 2/04* (2013.01); *G06K 9/4604* (2013.01); *G06K 9/4671* (2013.01); *G06K 9/6202* (2013.01); *G06T 7/00* (2013.01); *G06T 2207/10016* (2013.01)

(58) Field of Classification Search
None
See application file for complete search history.

(56) References Cited

U.S. PATENT DOCUMENTS

| 2008/0267464 A1 | 10/2008 | Goda et al. |
| 2015/0158309 A1 | 6/2015 | Fujii et al. |
| 2017/0046548 A1* | 2/2017 | Kamijo ................. G06K 1/121 |

FOREIGN PATENT DOCUMENTS

| JP | 2006-106655 A | 4/2006 |
| JP | 2007-534067 A | 11/2007 |
| JP | 2008-278070 A | 11/2008 |
| JP | 2009-087192 A | 4/2009 |
| JP | 2009-87292 A | 4/2009 |
| JP | 2013-069188 A | 4/2013 |
| JP | 5634121 B2 | 12/2014 |
| JP | 2015-044409 A | 3/2015 |
| JP | 2015-131483 A | 7/2015 |
| JP | 2015-200820 A | 11/2015 |
| WO | 2015/045453 A1 | 4/2015 |

OTHER PUBLICATIONS

Communication dated Jun. 10, 2020, issued by the Japanese Patent Office in application No. 2018-546110.
International Search Report of PCT/JP2016/081136 dated Dec. 27, 2016.

* cited by examiner

*Primary Examiner* — Matthew C Bella
*Assistant Examiner* — Brian D Shin
(74) *Attorney, Agent, or Firm* — Sughrue Mion, PLLC

(57) ABSTRACT

An individual identifying device includes a plurality of generation units and an imaging unit. The generation units generate a pattern on an object. The imaging unit acquires an image of the pattern in conjunction with generation of the pattern.

3 Claims, 21 Drawing Sheets

INDIVIDUAL IDENTIFYING DEVICE

CROSS REFERENCE TO RELATED APPLICATIONS

This application is a National Stage of International Application No. PCT/JP2016/081136 filed Oct. 20, 2016.

TECHNICAL FIELD

The present invention relates to an individual identifying device, an individual identifying method, and a program.

BACKGROUND ART

In order to ensure traceability of distributed objects and the like, generation of patterns for individual identification on various objects such as industrial products and goods has been performed. For example, in Patent Documents 1 and 2, a random distribution pattern of taggant particles is generated on an object.

Also, imaging of a pattern generated on an object for individual identification is performed. For example, in Patent Documents 1 and 2, a random distribution pattern on an object is imaged by a camera.

Further, Patent Document 3 describes a torque wrench having a function of generating a predetermined pattern in colored ink on the head of a fastening member so that it can be confirmed that it is a fastening member tightened with a set torque value. Moreover, in Patent Document 3, when the tightening is completed, the fastening member is imaged with a camera by an inspector, and the captured image is displayed on a screen display unit.

Meanwhile, there is another technique related to the present invention as described below.

Patent Document 4 describes a multi-function printer that functions as an electrophotographic copying apparatus and an identification information reading apparatus.

In the electrophotographic copying apparatus described in Patent Document 4, an ID function is given to each copy by allowing presence of light emission toner at random on each image. Specifically, first, by the exposure means, an electrostatic latent image is formed on the surface of an electrophotographic photosensitive member on the photosensitive drum, based on the original image. Next, by the developing means, a charged developer is attached to the electrophotographic photosensitive member on which the electrostatic latent image is formed, whereby the electrostatic latent image is developed. Here, as a developer, a developer containing a toner in which a toner that emits light by the light of a specific wavelength other than visible light (emission toner) is mixed with a non-emission toner. Next, by the transfer means, an image developed on the electrophotographic photosensitive member is transferred to copier paper. Then, by the fixing means, an image containing the emission toner and the non-emission toner is fixed onto the copier paper. Thereby, a copy image in which identification information is added to the original image is obtained.

Next, in the identification information reading apparatus described in Patent Document 4, a printed matter on which an image configured of emission toner and non-emission toner is formed irradiated with light having a specific wavelength other than visible light, and the image is optically read. In the image, light-emission toner is fixed randomly. Accordingly, when the pattern is read with light having a particular wavelength other than visible light, identification information for identifying the image information on the medium is obtained. The identification information is stored, or collated with identification information of another image that is previously stored.

In order to create a copy image in which identification information is added to the original image and acquire the identification information of the created copy image by using the multi-function printer described in Patent Document 4, a user needs to perform two operational steps. That is, first, a user generates a copy image from the original image by using the electrophotographic copying apparatus. Then, the user allows the identification information reader to read the generated copy image to acquire the identification information.

Further, Patent Document 5 describes a method of forming an optical scattering layer by coating a transparent substrate with ink using an inkjet system. Specifically, a coating step in which ink droplets are impacted on a transparent substrate from an inkjet head is repeated several times. Thereby, an optical scattering layer having an uneven structure on the transparent substrate is formed. Further, between a plurality of coating steps, a drying step for drying the ink applied to the transparent substrate by the preceding coating step is provided. The drying step is performed because the wettability of the ink, applied in the coating step after the drying step, is changed according to the surface energy state of the underlying. The ink is raised by a kind of self-organization phenomenon, whereby a periodic roughness structure is formed on the surface of the finally obtained coating film. Therefore, as there is no such a need after the last drying step, the drying step is not performed.

It is described that in the drying step, it is preferable to control the drying condition of the ink previously applied onto the transparent substrate, by the drying temperature and the drying time. Further, it is also described that the drying condition can be checked visually, or by microscopic observation, image analysis, or the like. It is described as an example that it is possible to confirm that the ink is dried by observing the state of the reflected light. It is also described that in the drying step, evaporation of the solvent in the ink is facilitated by using a drying means including a heating means such as a heater or an air supply means such as a fan.

Patent Document 6 describes a manufacturing method of a fine particle-containing sheet having anti-counterfeiting properties and an inspection method of a fine particle-containing sheet.

The manufacturing method described in Patent Document 6 includes a step of forming a fine particle-containing layer in which fine particles, having information that is identifiable through observation by being enlarged, are dispersed in a transparent resin. As a fine particle having identifiable information that is identifiable through observation by being enlarged, Patent Document 6 describes, as an example, one that has a three-dimensional shape and a recess on a pattern, and in which a three-dimensional shape of the characters "TEA" is observed when being enlarged. Further, in the inspection method described in Patent Document 6, light is emitted to the fine particle-containing sheet, and an image is captured by a camera. Then, the position of the fine particle is mapped from the image and stored in a database, and collation is performed.

Patent Document 1: JP 2007-534067 A
Patent Document 2: JP 2013-69188 A
Patent Document 3: JP 5634121 B
Patent Document 4: JP 2006-106655 A
Patent Document 5: JP 2015-200820 A
Patent Document 6: JP 2015-44409 A

SUMMARY

As described above, Patent Documents 1, 2, 4, and 6 describe generating a pattern on an object for individual identification, and acquiring an image of the generated pattern. However, they do not refer to acquiring of an image of a generated pattern immediately after generation of the pattern for individual identification on an object.

On the other hand, Patent Document 3 describes that a work of generating a pattern on an object and a work of acquiring an image of the generated pattern are performed continuously. However, in Patent Document 3, after generating a pattern on an object, whether or not to acquire an image of the generated pattern is left to the judgment of a person who operates the camera. Therefore, even though a pattern is generated on an object, there is a possibility that discrepancy occurs between generation of a pattern and acquisition of an image such that an image of the generated pattern may not be acquired or, on the contrary, an image of an object on which no pattern is generated may be acquired.

An exemplary object of the present invention is to provide an individual identifying device that solves the aforementioned problems.

An individual identifying device, according to an exemplary aspect of the present invention, includes a plurality of generation units that generate a pattern on an object, and an imaging unit that acquires an image of the pattern in conjunction with generation of the pattern.

An individual identifying method, according to another exemplary aspect of the present invention, includes generating a pattern on an object by a plurality of generation units, and acquiring an image of the pattern in conjunction with generation of the pattern.

A program, according to another exemplary aspect of the present invention, causes a computer to function as an imaging unit that acquires an image of a pattern in conjunction with generation of the pattern on an object.

As the present invention has the configuration described above, it is possible to prevent a discrepancy from occurring between generation of a pattern and imaging thereof.

EXEMPLARY EMBODIMENTS

Next, exemplary embodiments of the present invention will be described in detail with reference to the drawings.

First Exemplary Embodiment

Figure 1:
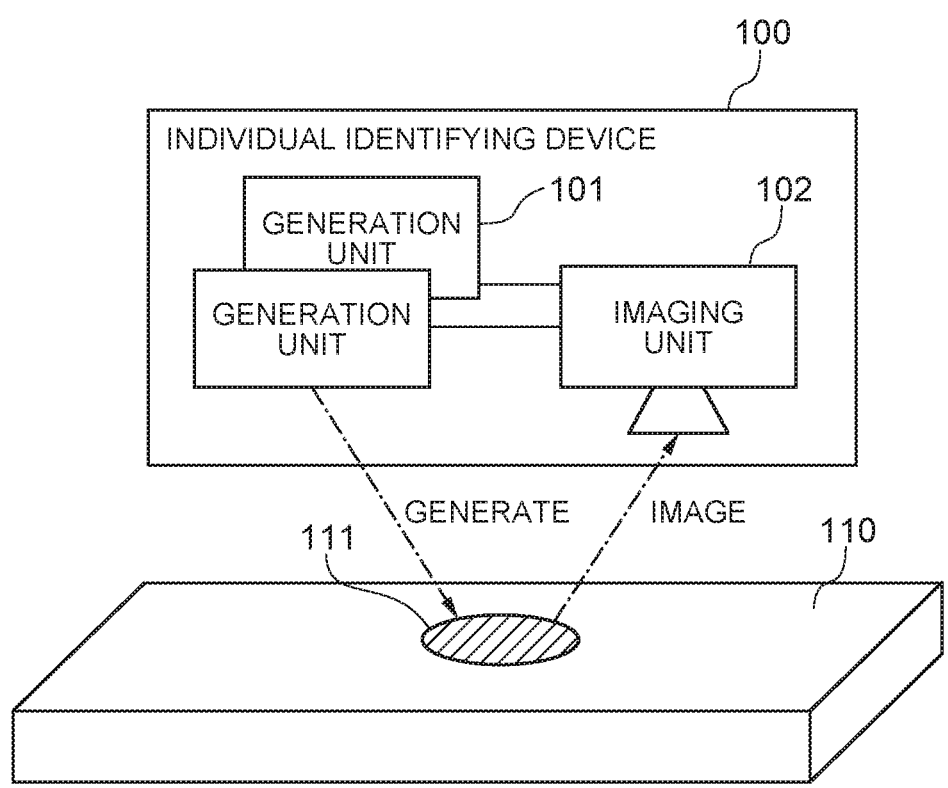
FIG. 1 is a diagram illustrating an exemplary configuration of an individual identifying device according to a first exemplary embodiment of the present invention.

Referring to FIG. 1, an individual identifying device 100 according to a first exemplary embodiment of the present invention is a device that generates a pattern 111 for individual identification on an object 110. The individual identifying device 100 is also a device that images the pattern 111 to acquire an image of the generated pattern 111. Furthermore, the individual identifying device 100 is a device that generates an individual identifier to be used for individual identification of the object 110, from the acquired image of the pattern 111.

The object 110 is a target to which the pattern 111 for individual identification is generated. The object 110 is an industrial product or a product package, for example. The object 110 may be any of personal belongings (such as a business card and a notebook) or part of an individual body (for example, a finger or the like).

The individual identifying device 100 includes two generation units 101 and an imaging unit 102 as main function units. In this example, the number of generation units is two. However, three or more generation units may be used.

The generation unit 101 has a function of generating the pattern 111 for individual identification on the object 110. The generation unit 101 generates the pattern 111 by applying ink onto the object 110, for example. The generation unit 101 may include an ink supply unit such as an ink pen or an inkjet, for example.

Figure 2:
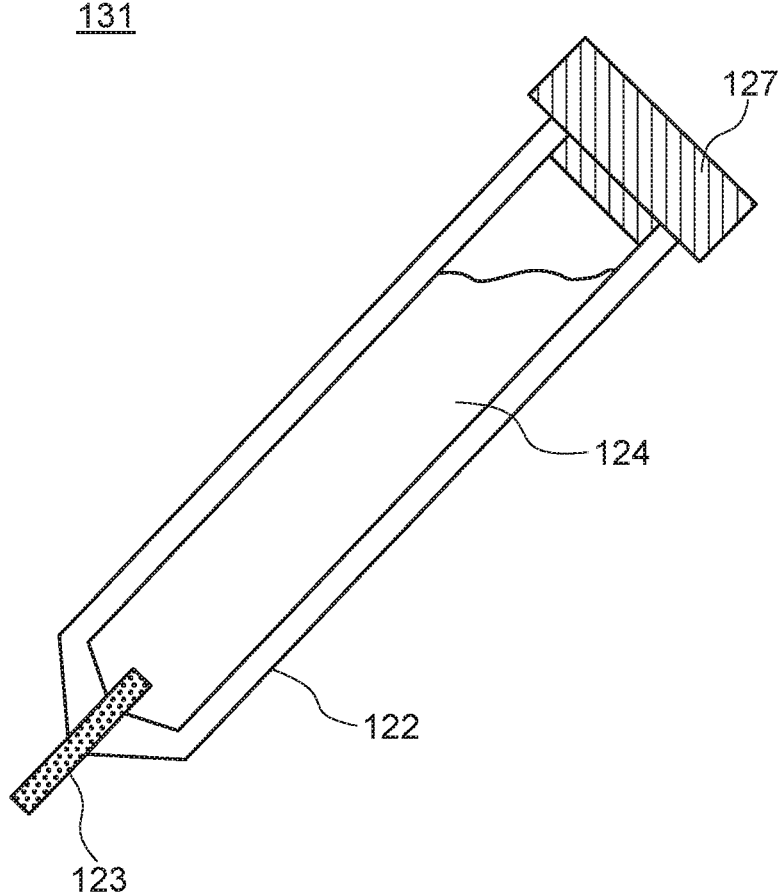
FIG. 2 is a diagram illustrating an example of an ink supplying unit usable as a generation unit of the individual identifying device according to the first exemplary embodiment of the present invention.

FIG. 2 illustrates an example of an ink supply unit usable as the generation unit 101. An ink supply unit 131 of this example is configured such that a nib portion 123 made of a felt material is mounted in a through hole provided at the tip end portion of a pen-shaped housing 122. Further, the housing 122 is filled with the ink 124. A cap 127 attached to the rear end of the housing 122 is detachable so as to enable refilling of the ink 124. The ink 124 in the housing 122 always soaks into the nib portion 123 by capillary action. As a result, when the nib portion 123 is brought into contact with the surface of the object 110, the ink that oozes out from the tip of the nib portion 123 can be applied to the object 110. Note that the nib portion 123 may not be made of a felt material but has a structure having a ball and a tip (member for supplying ink from an ink tank to the ball) like a nib of a ballpoint pen.

When the ink supply unit 131 illustrated in FIG. 2 is used for each of the two generation units 101, the ink color of the ink supply unit 131 used for one generation unit 101 and the ink color of the ink supplying unit 131 used for the other generation unit 101 are made different from each other. For example, one ink is black, and the other ink is red. Alternatively, one ink is deep red, and the other ink is pale red. Then, by using the two ink supply units 131 using the inks of different colors, a pattern is generated on the object 110 by applying the inks almost simultaneously to almost the same positions on the object 110. Here, applying the inks to almost the same positions on the object 110 means applying the next ink so as to overlap with at least part of the region on the object 110 coated with the first ink. Further, applying the inks on the object 110 almost simultaneously means that the next ink is applied by the time when the ink applied first dries completely. By applying the inks almost simultaneously to almost the same positions on the object 110 as described above, the inks are mixed with each other until they dry and are solidified, whereby a random pattern 111 is generated.

Figure 3:
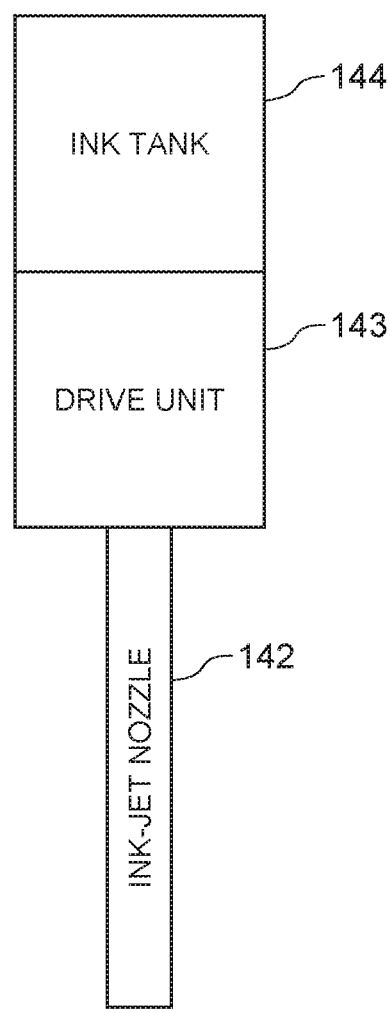
FIG. 3 is a diagram illustrating another example of an ink supplying unit usable as a generation unit of the individual identifying device according to the first exemplary embodiment of the present invention.

FIG. 3 illustrates another example of an ink supply unit usable as the generation unit 101. An ink supply unit 141 of this embodiment 141 includes an ink-jet nozzle 142, a drive unit 143, and an ink tank 144. In the ink tank 144, ink is stored. When the drive unit 143 receives an output command over a signal line not illustrated, the drive unit 143 allows an ink supplied from the ink tank 144 to be jetted from the tip end of the ink-jet nozzle 142 for a certain time at a predetermined pressure. The ink jetted to the outside adheres to the surface of the object and forms a pattern. As the ink supply unit 141, a commercially available inkjet marker may be used, for example.

Figure 4:
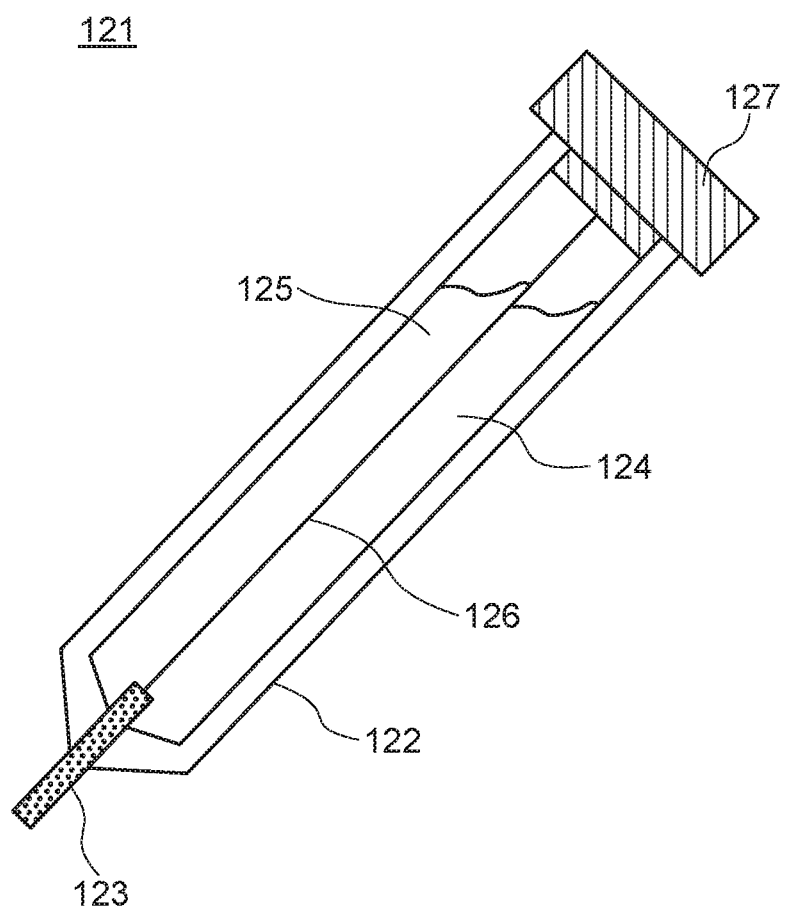
FIG. 4 is a diagram illustrating another example of an ink supplying unit usable as a generation unit of the individual identifying device according to the first exemplary embodiment of the present invention.

When the ink supply unit 141 illustrated in FIG. 4 is used for each of the two generation units 101, the ink color of the ink supply unit 141 used for one generation unit 101 and the ink color of the ink supplying unit 141 used for the other generation unit 101 are made different from each other. Then, by using the two ink supply units 141 using the inks of different colors, a pattern is generated on the object 110 by applying the inks almost simultaneously to almost the same positions on the object 110. Thereby, the inks are mixed with each by the time they dry and are solidified, and a random pattern 111 is generated.

FIG. 4 illustrates an example of an ink supply unit usable as the two generation units 101. An ink supply unit 121 of this example is configured such that a nib portion 123 made of a felt material is mounted in a through hole provided at the tip end portion of a pen-shaped housing 122. The nib portion 123 may not be made of a felt material but has a structure having a ball and a tip like a nib of a ballpoint pen. The inside of the housing 122 is partitioned into two rooms by a partition wall 126, and the respective rooms are filled with inks 124 and 125. The ink 124 and the ink 125 have different colors from each other. For example, one ink is black, and the other ink is red. Alternatively, one ink is deep red, and the other ink is pale red. A cap 127 attached to the rear end of the housing 122 is detachable so as to enable refilling of the inks 124 and 125. The inks 124 and 125 in the respective rooms in the housing 122 regularly soak into the nib portion 123 by capillary phenomenon. Even in the tip portion of the nib portion 123, both inks are not mixed completely. As a result, when the nib portion 123 is brought into contact with the surface of the object 110, the ink that oozes from the tip of the nib portion 123 can be applied to an object 110. At that time, a random pattern can be generated by the two colors of the inks on the object 110.

Figure 5:
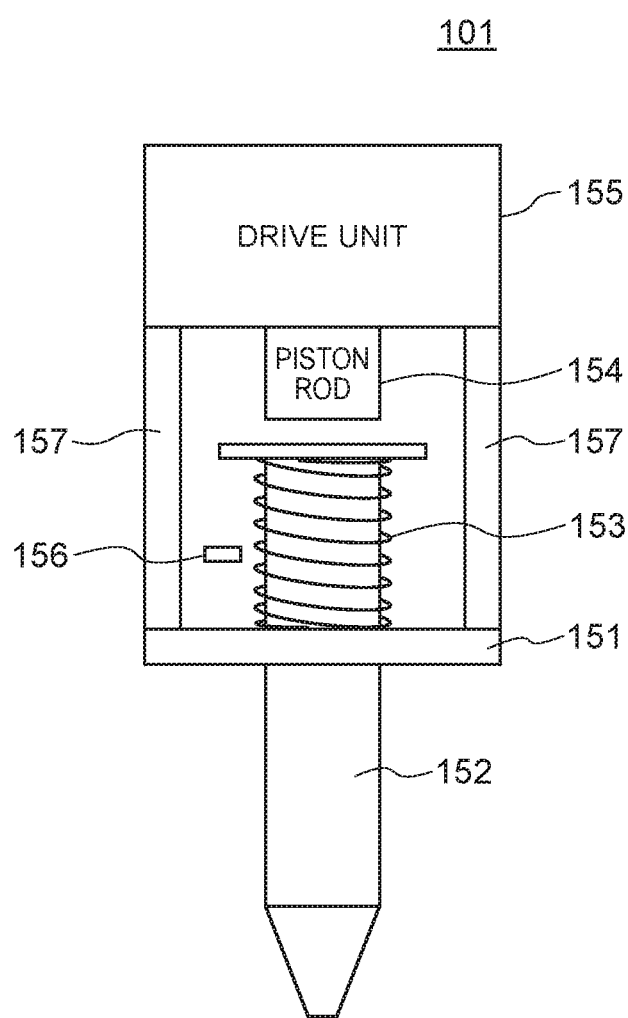
FIG. 5 is a diagram illustrating an exemplary configuration of the generation unit of the individual identifying device according to the first exemplary embodiment of the present invention.
Figure 6:
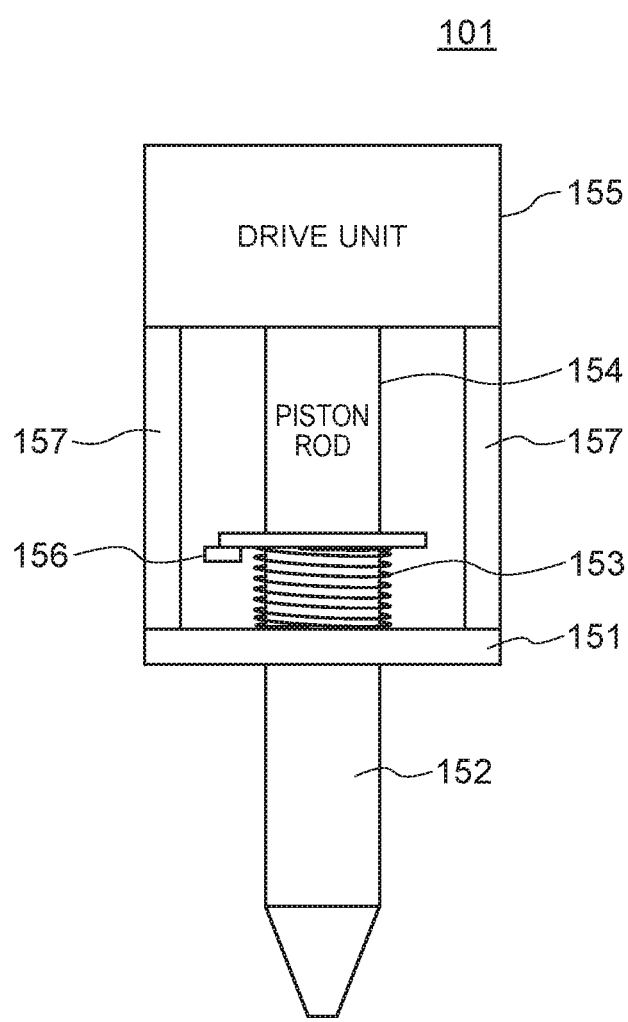
FIG. 6 is a diagram illustrating a state where an ink supplying unit of the generation unit of the individual identifying device is lowered to a pattern generation position in the first exemplary embodiment of the present invention.

FIG. 5 is a block diagram illustrating an example of the generation unit 101. In the generation unit 101 of this example, an ink supply unit 152 is detachably mounted in a through hole provided in a plate 151. The ink supply unit 152 has a return spring 153 that constantly applies upward elastic force to the ink supply unit 152. Above the ink supply unit 152, there is a drive unit 155 that vertically moves a piston rod 154 of a cylinder when receiving a predetermined command from the outside. The housing of the drive unit 155 and the plate 151 are connected by a connecting member 157. As illustrated in FIG. 6, when the piston rod 154 is stroked downward by the drive unit 155 to press the ink supply unit 152, the ink supply unit 152 is lowered from the standby position to the ink supply position against the elastic force of the return spring 153. Thereby, when the ink supply unit 152 is of the pen type as illustrated in FIG. 2 or 4, the nib portion 123 abuts against the surface of the object 110 and the ink is supplied to the surface of the object 110. In the case where the ink supply unit 152 is of the ink-jet type as illustrated in FIG. 3, the tip end portion of the ink-jet nozzle 142 is positioned at a height appropriate for jetting out the ink. When the ink is jetted from the position, the ink is supplied to the surface of the object 110. On the other hand, when the piston rod 154 is raised by the drive unit 155, the ink supply unit 152 is raised to the standby position by the elastic force of the return spring 153.

In the generation unit 101 illustrated in FIG. 5, the ink supply unit 152 is moved from the standby position to the ink supply position, and is also moved from the ink supply position to the standby position. In order to do so, a cylinder stroke mechanism with the piston rod 154 of the cylinder is used. However, the mechanism of vertically moving the ink supply unit 152 is not limited to the cylinder stroke mechanism. It is possible to use another mechanism such as a linear motion mechanism using a linear guide and a ball screw, for example.

Referring to FIG. 1 again, the imaging unit 102 has a function of imaging the pattern 111 in conjunction with generation of the pattern 111 by the generation units 101. The imaging unit 102 also has a function of acquiring an image of the pattern 111 after stabilization of the pattern 111 generated by the generation units 101. Furthermore, the imaging unit 102 also has a function of extracting an individual identifier from the acquired image of the pattern 111.

Figure 7:
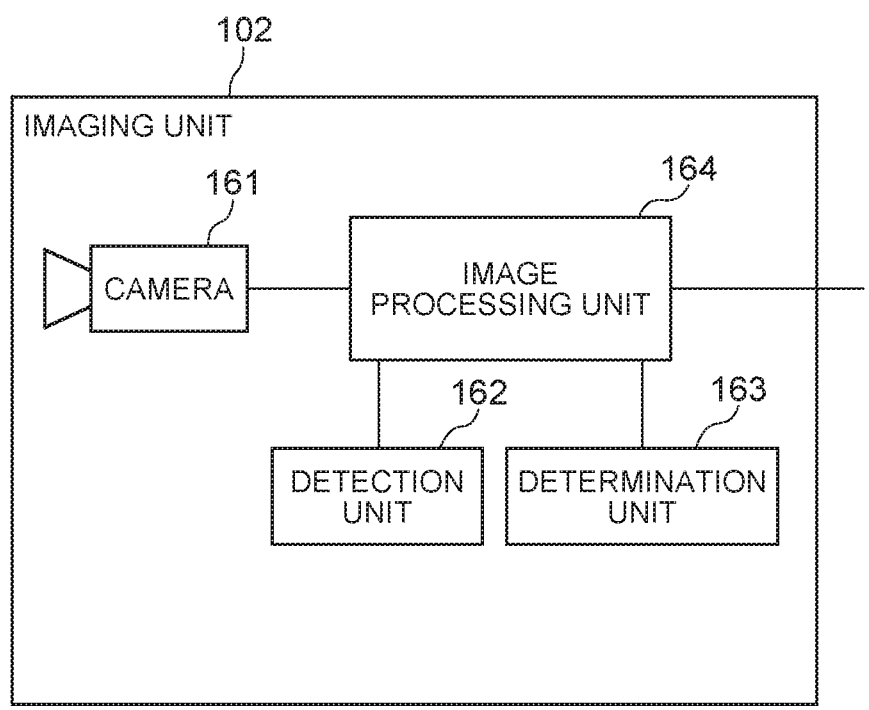
FIG. 7 is a diagram illustrating an exemplary configuration of an imaging unit of the individual identifying device according to the first exemplary embodiment of the present invention.
Figure 21:
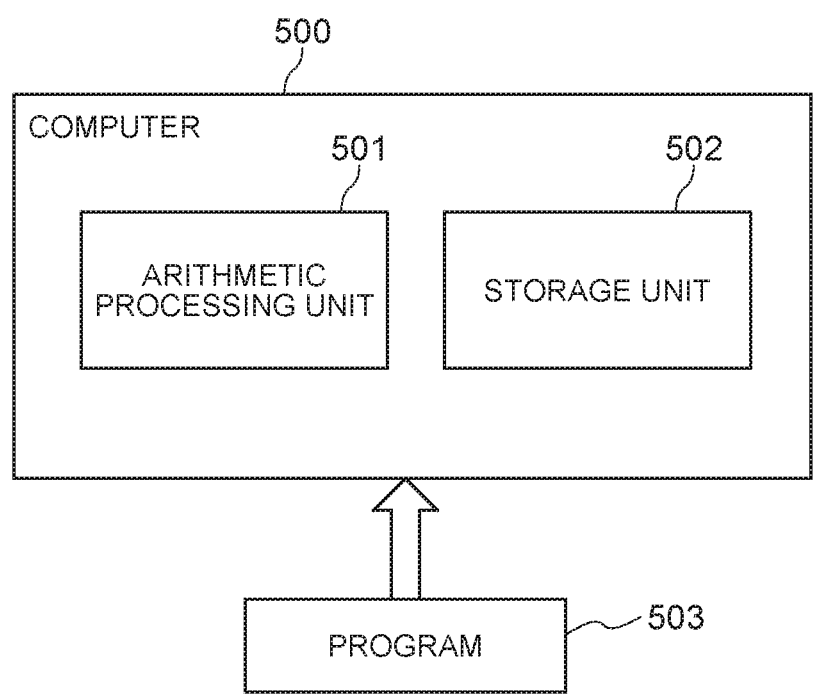
FIG. 21 is a diagram illustrating an example of a computer for implementing an individual identifying device of the present invention.

FIG. 7 is a block diagram illustrating an example of the imaging unit 102. The imaging unit 102 of this example includes a camera 161, a detection unit 162, a determination unit 163, and an image processing unit 164. The detection unit 162, the determination unit 163, and the image processing unit 164 can be implemented by a computer 500 including an arithmetic processing unit 501 and a storage unit 502 and a program 503 as illustrated in FIG. 21, besides a dedicated hardware. The program 503 is read by the computer 500 when the computer 500 is started or the like, and controls the operation of the computer 500 to thereby implement the detection unit 162, the determination unit 163, and the image processing unit 164 on the computer 500.

The camera 161 may be configured of a charge coupled devices (CCD) image sensor or a complementary metal oxide (CMOS) image sensor, for example.

The detection unit 162 has a function of detecting whether or not generation of a pattern is performed by the generation units 101. The determination unit 163 has a function of determining whether or not the pattern generated by the detection unit 162 is stabilized. The image processing unit 164 has a function of acquiring an image of the pattern after it is determined that the pattern is stabilized. The image processing unit 164 also has a function of extracting and outputting a feature amount for individual identification from the acquired image. Hereinafter, exemplary configurations of the detection unit 162, the determination unit 163, and the image acquisition unit 164 will be described in detail.

First, an exemplary configuration of the detection unit 162 will be described.

The detection unit 162 may be configured to detect motion of the generation units 101 when they generate a pattern to thereby detect whether or not generation of a pattern is performed by the generation units 101. For example, if the generation units 101 perform a predetermined motion when generating a pattern, the detection unit 162 may be configured to detect the predetermined motion of the generation units 101. For example, when the generation units 101 have the configuration illustrated in FIG. 5, it is possible to have a configuration of detecting, by a limit switch 156, that the ink supply unit 152 is lowered to the ink supply position, as illustrated in FIGS. 5 and 6.

The detection unit 162 may also be configured to detect whether or not generation of a pattern is performed by the generation units 101, by exchanging a signal with the generation units 101. For example, when the generation units 101 have the configuration illustrated in FIG. 5, a command given from the outside to the drive unit 155 is also given to the detection unit 162 simultaneously. The detection unit 162 detects that a pattern is generated by the generation units 101 when it receives a command from the generation units 101.

The detection unit 162 may also be configured to detect whether or not generation of a pattern is performed by the generation units 101 by detecting a visual change in a predetermined region on the object 110 through image recognition. For example, the detection unit 162 acquires an image of a predetermined region on the object 110 at certain time intervals by the camera 161 via the image acquisition unit 164. As the predetermined region, a region including a portion where the pattern 111 is planned to be generated is desirable. Next, the detection unit 162 calculates a difference between a predetermined feature amount extracted from one acquired image and a predetermined feature amount extracted from one image acquired immediately before it, and compares an absolute value of the calculated difference with a threshold. Here, as a feature amount, an average value of luminance values of an image may be used. However, it is not limited thereto. Next, when the absolute value of the difference is larger than the threshold, the detection unit 162 determines that the generation units 101 have generated a pattern. Otherwise, the detection unit 162 determines that the generation units 101 have not generated a pattern. In general, a region where a pattern is planned to be generated is significantly changed visually, before and after the generation of a pattern. Therefore, by detecting such a visual change, it is possible to detect whether or not the generation units 101 have generated a pattern.

Next, an exemplary configuration of the determination unit 163 will be described.

Figure 8:
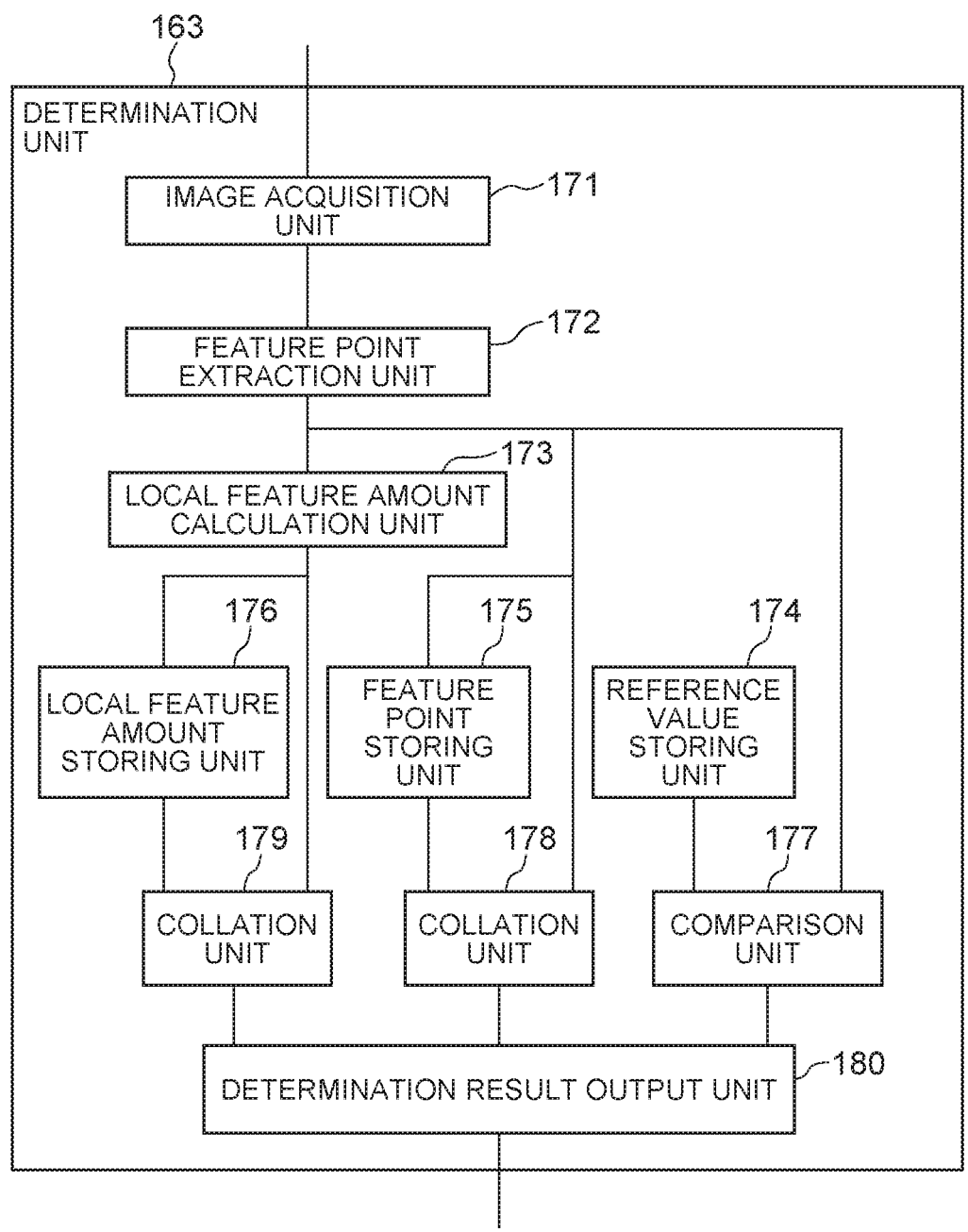
FIG. 8 is a diagram illustrating an exemplary configuration of a determination unit provided to the imaging unit of the individual identifying device according to the first exemplary embodiment of the present invention.

FIG. 8 is a block diagram illustrating an example of the determination unit 163. The determination unit 163 of this example determines, through image processing, whether or not the pattern 111 is stabilized, based on time-series images obtained by imaging the pattern 111 generated on the object 110 in a time-series manner. The determination unit 163 includes an image acquisition unit 171, a feature point extraction unit 172, a local feature amount calculation unit 173, a reference value storing unit 174, a feature point storing unit 175, a local feature amount storing unit 176, a comparison unit 177, collation units 178 and 179, and a determination result output unit 180.

The image acquisition unit 171 acquires time-series images of the pattern 111 generated on the object 110 directly from the camera 161 or indirectly via the image processing unit 164. To the acquired image, an image identifier i such as an image number is given.

The feature point extraction unit 172 extracts characteristic points (feature points) existing at edges or corners from an image, by the action of a differential filter (sobel or the like) on the two-dimensional luminance distribution of the image acquired by the image acquisition unit 171. The local feature amount calculation unit 173 calculates, from an extracted feature point and a pixel value of a pixel in the vicinity thereof, the feature amount relating to the feature point (local feature amount). As the local feature amount, a method of assigning an orientation (direction) for each feature point based on the gradient or the gradient direction of the distribution of pixel values in a two-dimensional array, such as Scale Invariant Feature Transform (SIFT) or Binary Robust Independent Elementary Features (BRIEF) can be used, for example. However, it is not limited thereto.

The reference value storing unit 174 stores a reference value to be compared with the number of feature points extracted from each image of the time-series images. The reference value is determined based on the number of feature points necessary for achieving predetermined collation accuracy. The feature point storing unit 175 stores information of feature points (such as the number of the feature points and positions in the image) extracted from each image of the time-series images, in association with the image identifier i. The local feature amount storing unit 176 stores a local feature amount calculated from each feature point of each image of the time-series images, in association with the image identifier i.

Each time a feature point is extracted from an image having the image identifier i by the feature point extraction unit 172, the comparison unit 177 compares the number of feature points extracted from the image with the reference value stored in the reference value storing unit 174. When the number of extracted feature points exceeds the reference value, the comparison unit 177 outputs a set of the image identifier i and a value 1. Otherwise, the comparison unit 177 outputs a set of the image identifier i and a value 0.

Each time a feature point is extracted from an image having the image identifier i by the feature point extraction unit 172, the collation unit 178 collates the information of the extracted feature points with the information of the feature points extracted from an immediately preceding image in time (image identifier i−1) stored in the feature point storing unit 175, and calculates a score indicating the degree of similarity between the two. For example, the collation unit 178 calculates the score by using the number of feature points corresponding to each other between both images. Alternatively, the collation unit 178 calculates the score by normalizing the number of feature points corresponding to each other between both images with the number of feature points in the collation target image. However, the method of calculating the score is not limited thereto. The collation unit 178 compares the calculated score with a threshold, and when the score has higher similarity than the threshold, the collation unit 178 outputs a set of the image identifier i and a value 1. Otherwise, the collation unit 178 outputs a set of the image identifier i and a value 0.

Each time a local feature amount is extracted from an image having the image identifier i by the local feature amount calculation unit 173, the collation unit 179 collates the extracted local feature amount with the local feature amount extracted from an immediately preceding image in time (image identifier i−1) stored in the local feature amount storing unit 176, and calculates a score indicating the degree of similarity between the two. For example, the collation unit 179 calculates the score by using the number of local feature amounts corresponding to each other between both images. Alternatively, the collation unit 179 calculates the score by normalizing the number of local feature amounts corresponding to each other between both images with the number of local feature amounts in the collation target image. Alternatively, the collation unit 179 calculates the score from the Hamming distance between codes representing the local feature amounts of the two. However, the method of calculating the score is not limited thereto. The collation unit 179 compares the calculated score with a threshold, and when the score has higher similarity than the threshold, the collation unit 179 outputs a set of the image identifier i and a value 1. Otherwise, the collation unit 179 outputs a set of the image identifier i and a value 0.

Figure 9:
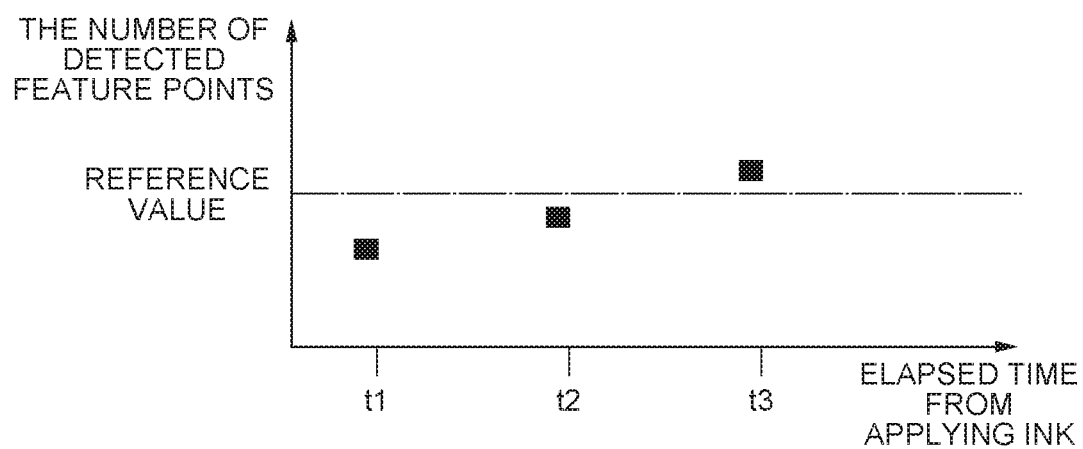
FIG. 9 is an exemplary graph for explaining an operation of a comparison unit included in the determination unit provided to the imaging unit of the individual identifying device according to the first exemplary embodiment of the present invention.

FIG. 9 is a graph for explaining the operation of the comparison unit 177 in the determination unit 163. The horizontal axis represents an elapsed time after the ink is supplied, the vertical axis represents the number of detected feature points, and a black circle represents the number of feature points acquired from each of the images constituting the time-series images. Further, one-dot chain line represents a reference value stored in the reference value storing unit 174. As illustrated in FIG. 9, in general, the number of feature points extracted from an image increases as the time passes after the ink is supplied. This is because during the time until the ink dries (several milliseconds to several seconds to several tens seconds), the characteristics of reflection and transmission of light of the substrate of the ink are changed in a direction of increasing the number of feature points. Accordingly, a certain reference value is set, and when the number of extracted feature points exceeds the reference value, it is determined that the pattern is stabilized. In the example of FIG. 9, although the number of feature points extracted from either of two images captured at time t1 and time t2 is below the reference value, the number of feature points extracted from an image captured at time t3 exceeds the reference value. Therefore, for the images captured at time t1 and time t2, the comparison unit 177 outputs a set of the image identifier thereof and a value 0, while outputs a set of the image identifier thereof and a value 1 for the image captured at time t3.

Figure 10:
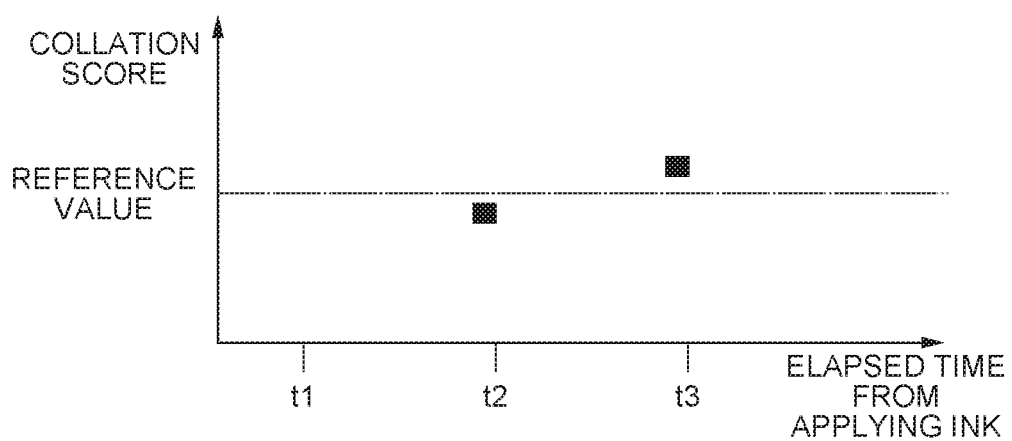
FIG. 10 is an exemplary graph for explaining an operation of a collation unit included in the determination unit provided to the imaging unit of the individual identifying device according to the first exemplary embodiment of the present invention.

FIG. 10 is a graph for explaining the operation of the collation units 178 and 179 in the determination unit 163. The horizontal axis represents an elapsed time after the ink is supplied, the vertical axis represents the collation score, and a black circle represents a collation score between each image constituting the time-series images and an immediately preceding image thereof. Further, a one-dot chain line represents a threshold. The example illustrated in FIG. 10 shows a case where as the collation score is greater, information of feature points and local feature amounts of two images are more similar. As illustrated in FIG. 10, in general, the collation score with the immediately preceding image increases as the time passes after the ink is supplied. This is because although the characteristics of reflection and transmission of light of the substrate of the ink are changed during the time until the ink dries (several milliseconds to several seconds to several tens seconds), when the ink almost dried, such a change does not occur. Therefore, a certain threshold is set, and when the score with the immediately preceding image exceeds the threshold, it is determined that the pattern is stabilized. In the example of FIG. 10, although the collation score between the two images captured at time t1 and time t2 is below the threshold, the collation score between the image captured at time t3 and the image captured at time t2 exceeds the threshold. Therefore, for the image captured at time t2, the collation units 178 and 179 output a set of the image identifier thereof and a value 0, and for the image captured at time t3, output a set of the image identifier thereof and a value 1. Further, for the image of time t1 that is captured first after the ink is supplied, the collation units 178 and 179 output a value 0 unconditionally.

Figure 11:
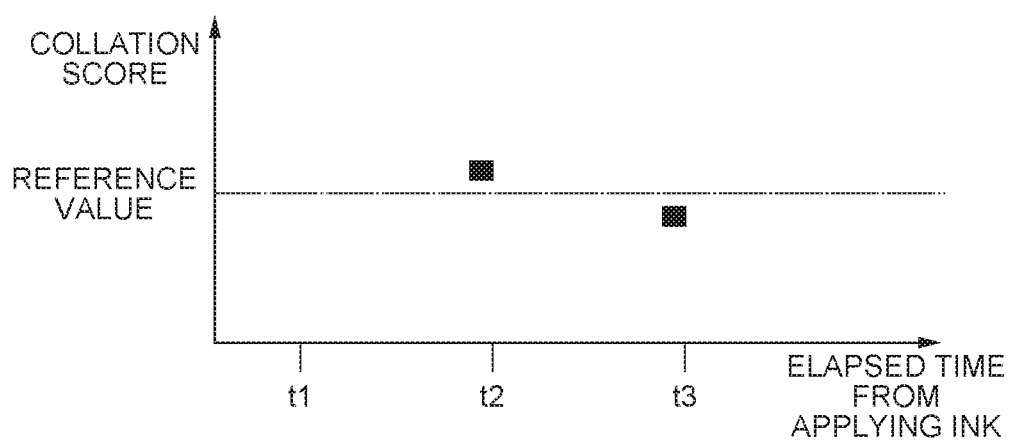
FIG. 11 is another example of a graph for explaining an operation of the collation unit included in the determination unit provided to the imaging unit of the individual identifying device according to the first exemplary embodiment of the present invention.

FIG. 11 is a graph for explaining the operation of the collation units 178 and 179 in the determination unit 163. The horizontal axis represents the elapsed time after the ink is supplied, the vertical axis represents the collation score, and a black circle represents a collation score between each image constituting the time-series images and an immediately preceding image. Further, a one-dot chain line represents a threshold. The example illustrated in FIG. 11 shows a case where as the collation score is smaller, information of feature points and local feature amounts of the two images are more similar. In the example of FIG. 11, although the collation score between the two images captured at time t1 and time t2 exceeds the threshold, the collation score between the image captured at time t3 and the image captured at time t2 is below the threshold. Therefore, for the image captured at time t2, the collation units 178 and 179 output a set of the image identifier thereof and a value 0, and for the image captured at time t3, output a set of the image identifier thereof and a value 1. Further, for the image of time t1 that is captured first after the ink is supplied, the collation units 178 and 179 output a value 0 unconditionally.

Figure 12:
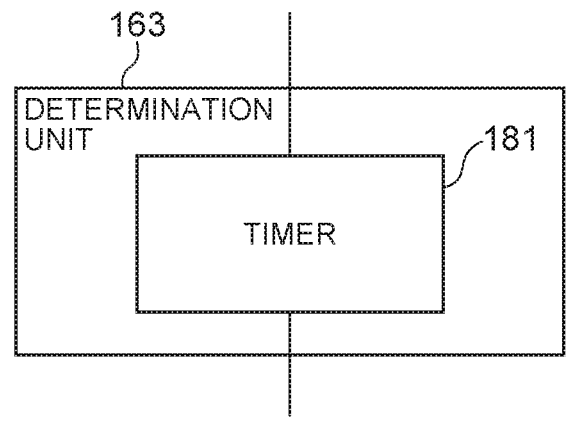
FIG. 12 is a diagram illustrating another exemplary configuration of a determination unit provided to the imaging unit of the individual identifying device according to the first exemplary embodiment of the present invention.

FIG. 12 is a block diagram illustrating another example of the determination unit 163. The determination unit 163 of this embodiment includes a timer 181.

The timer 181 is activated when generation of the pattern 111 is detected by the detection unit 162, and after a subsequent predetermined period has passed, the timer 181 outputs a signal indicating that the pattern 111 is stabilized. The predetermined period is determined based on the result of actually measuring the time from generation of the pattern 111 by supplying ink to the object 110 until the pattern 111 is stabilized.

Next, the image processing unit 164 will be described.

Figure 13:
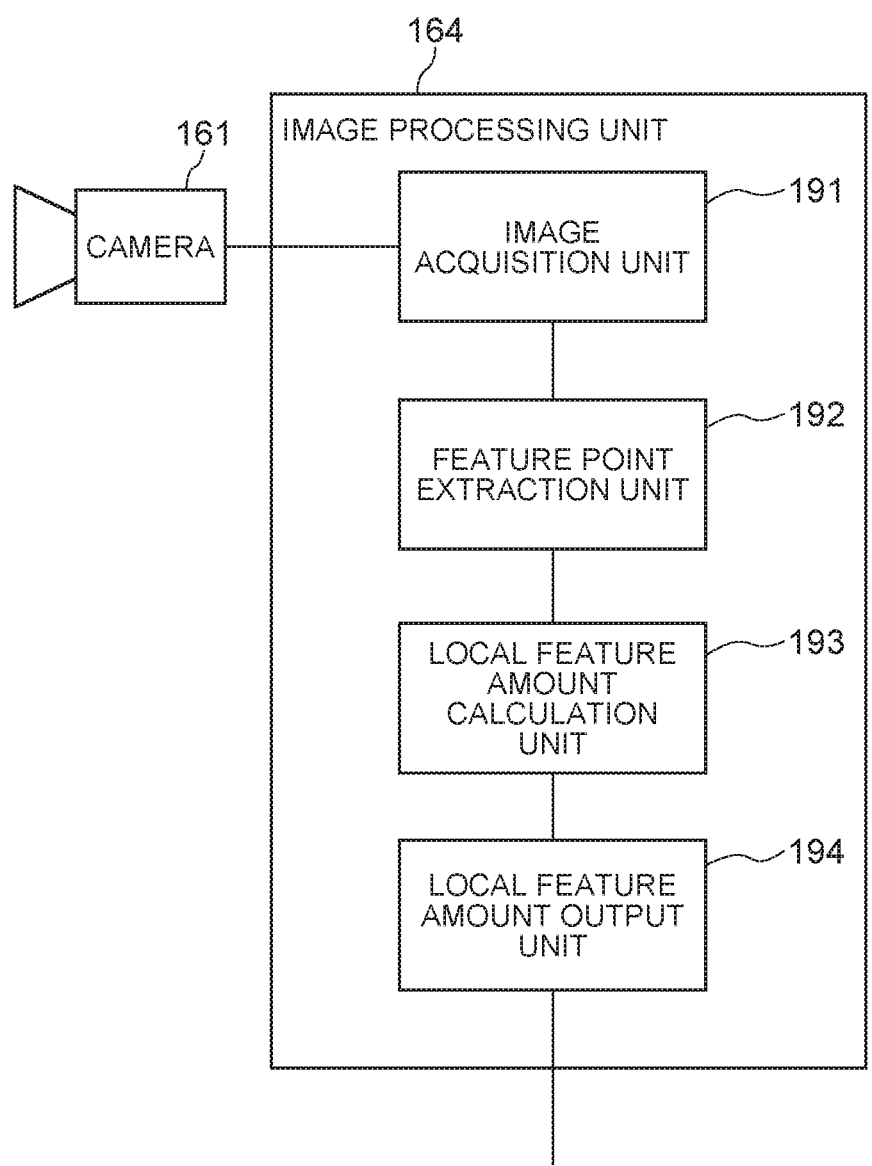
FIG. 13 is a diagram illustrating an exemplary configuration of an image processing unit provided to the imaging unit of the individual identifying device according to the first exemplary embodiment of the present invention.

FIG. 13 is a block diagram illustrating an example of the image processing unit 164. The image processing unit 164 of this example includes an image acquisition unit 191, a feature point extraction unit 192, a local feature amount calculation unit 193, and a local feature amount output unit 194.

The image acquisition unit 191 has a function of acquiring an image of the pattern 111 on the object 110 with use of the camera 161. The image acquisition unit 191 acquires one image by transmitting a command to release the shutter to the camera1 161 and reading, from the camera 161, an image captured by the camera 161 according to the command, for example. The image acquisition unit 191 transmits the acquired image to the processing unit in the subsequent stage, or outputs it to the detection unit 162 and the determination unit 163.

The feature point extraction unit 192 and the local feature amount calculation unit 193 have functions similar to those of the feature point extraction unit 172 and the local feature amount calculation unit 173 illustrated in FIG. 8. That is, the feature point extraction unit 192 extracts characteristic points (feature points) existing at edges or corners from an image acquired by the image acquisition unit 191. The local feature amount calculation unit 193 calculates, from an extracted feature point and a pixel value of a pixel in the vicinity thereof, the feature amount relating to the feature point (local feature amount).

The local feature amount output unit 194 outputs the local feature amount calculated by the local feature amount calculation unit 193 as an individual identifier of the object 110. The local feature amount output unit 194 outputs the local feature amount to an external server device or the like in a wired or wireless manner, or outputs the local feature amount to an external database, and stores it therein, for example.

Figure 14:
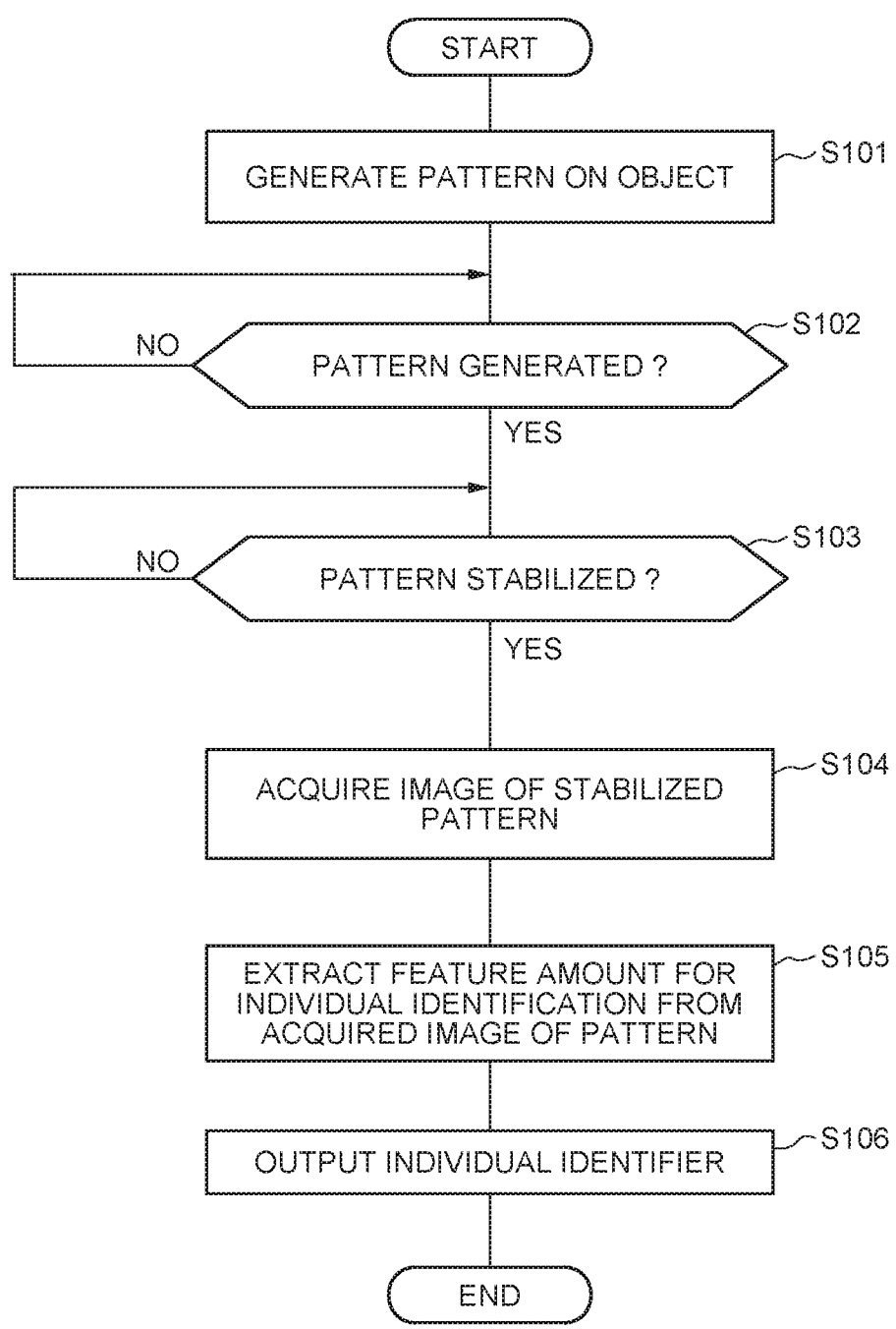
FIG. 14 is a flowchart illustrating a procedure of an individual identifying method performed using the individual identifying device according to the first exemplary embodiment of the present invention.

FIG. 14 is a flowchart illustrating a procedure of an individual identifying method performed using the individual identifying device 100. Hereinafter, the individual identifying method according to the present embodiment will be described with reference to FIG. 14.

First, the generation units 101 of the individual identifying device 100 generate a pattern 111 for individual identification by applying ink to almost the same positions on the object 110 almost simultaneously (step S101). For example, in the case of the generation unit 101 illustrated in FIG. 5, the piston rod 154 is stroked downward by the drive unit 155 to lower the ink supply unit 152 from the standby position to the ink supply position. Thereby, when the ink supply unit 152 is of the pen type as illustrated in FIG. 2 or 4, the nib portion 123 abuts against the surface of the object 110 and the ink is supplied to the surface of the object 110. In the case where the ink supply unit 152 is of the ink-jet type as illustrated in FIG. 3, the tip end portion of the ink-jet nozzle 142 is positioned at a height appropriate for jetting out the ink. When the ink is jetted from the position, the ink is supplied to the surface of the object 110. To the position to which the ink is supplied in this way, by supplying an in with use of the other generation unit 101 of the different ink color almost simultaneously or sequentially, a random pattern formed of the two colors of the inks is generated. On the other hand, in the case where the ink supply unit 152 is an ink supply unit that can apply unmixed two colors of inks by one pen as illustrated in FIG. 4, the nib portion 123 comes into contact with the surface of the object 110, and the ink is supplied to the surface of the object 110. Thereby, a random pattern formed of the two colors of inks is generated. In either case, then, the piston rod 154 is raised by the drive unit 155, whereby the ink supply unit 152 is raised to the standby position.

Next, the imaging unit 102 of the individual identifying device 100 detects whether or not generation of a pattern is performed by the generation units 101 (step S102). Specifically, the imaging unit 102 uses the detection unit 162 to detect a predetermined motion of the generation units 101 to thereby detect whether or not generation of a pattern is performed. Alternatively, the imaging unit 102 uses the detection unit 162 to detect a visual change in the pattern generation planned region on the object 110 through image recognition, to thereby detect whether or not generation of a pattern is performed. Alternatively, the imaging unit 102 uses the detection unit 162 to exchange, with the generation units 101, a command for the drive unit 155 to thereby detect whether or not generation of a pattern is performed.

Next, when the imaging unit 102 detects that a pattern is generated by the generation units 101, the imaging unit 102 determines whether or not the generated pattern 111 is stabilized (step S103). Specifically, the imaging unit 102 uses the determination unit 163 to compare the number of feature points extracted from a plurality of images constituting the time-series images of the pattern obtained by imaging the pattern in a time-series manner after the generation of the pattern with a reference value, and at a point of time when an image in which the number of feature points exceeds the reference value is obtained, the imaging unit 102 determines that the pattern is stabilized. Alternatively, the imaging unit 102 uses the determination unit 163 to compare information related to each of the feature points extracted from a plurality of images constituting the time-series images of the pattern obtained by imaging the pattern in a time-series manner after the generation of the pattern with each other, and at a point of time when a temporally subsequent image from which information related to a plurality of feature points that is almost similar to the information related to the feature points extracted from a temporally preceding image is obtained, the imaging unit 102 determines that the pattern is stabilized. Alternatively, the imaging unit 102 uses the determination unit 163 to determine that the pattern is stabilized at a point of time when a predetermined time has passed since generation of the pattern.

Next, when the imaging unit 102 detects that the generated pattern 111 is stabilized, the imaging unit 102 acquires an image of the pattern 111 after the pattern is stabilized (step S104). Specifically, after it is detected that the pattern 111 is stabilized with use of the image processing unit 164, the imaging unit 102 acquires an image of the pattern 111 by using the camera 161. Alternatively, in the case where the determination unit 163 has the configuration illustrated in FIG. 8, as the pattern after being stabilized has been acquired by the image acquisition unit 171, the imaging unit 102 omits the operation of acquiring it again.

Next, the imaging unit 102 extracts the local feature amount for individual identification from the acquired image of the pattern (step S105). Specifically, the imaging unit 102 uses the image processing unit 164 to extract the local feature amount for individual identification from an image of the pattern in a stable state. Alternatively, in the case where the determination unit 163 has the configuration illustrated in FIG. 8, as the local feature amount for individual identification has been extracted by the image acquisition unit 171 from the image of the pattern after being stabilized, the imaging unit 102 omits the operation of acquiring it again.

Next, the imaging unit 102 outputs the extracted individual identifier to the outside (step S106). Specifically, the imaging unit 102 uses the image processing unit 164 to transmit, to an external server device, the local feature amount extracted from an image of the stable pattern, along with the attribute information of the object 110 (name and number of the object 110 and the like), or store them in a database. In the case where the determination unit 163 has the structure illustrated in FIG. 8, the imaging unit 102 reads out the local feature amount extracted from an image of the pattern in a stable state from the local feature amount storing unit 176 of the image processing unit 164, and transmits it to an external server device along with the attribute information of the object 110, or stores them in a database.

As described above, according to the present embodiment, the imaging unit 102 acquires an image of a generated pattern in conjunction with generation of the pattern by the generation units 101. Therefore, it is possible to prevent a case of forgetting acquiring of an image of a generated pattern although the pattern is generated on the object 111, and to prevent a case of acquiring an image of an object on which a pattern is not generated. Therefore, it is possible to prevent a discrepancy from occurring between generation of a pattern and acquisition of an image.

Meanwhile, the configuration of generating a random pattern on the object with an ink mixed with fine particles such as metal powder or glass powder or fine particles composed of taggant or the like, as described in Patent Documents 1 and 2, involves a problem described below. That is, fine particle-containing ink may be the cause of clogging of the nozzle and the nib. Therefore, it is difficult to increase the size of the particles. Therefore, the applied random pattern may be very small. Accordingly, it is necessary to increase the magnification of the image capturing. Further, in the case of a moving object, it is difficult to clearly capture an image of the random pattern. Therefore, a precise expensive camera is required, and the usability thereof is also lowered. Further, in order to apply a particle-containing ink stably, the mechanism of the inkjet or the nib it self and the maintenance thereby becomes expensive. In contrast, in the present embodiment, by applying a plurality of inks having different colors to almost the same positions on the object 110 almost simultaneously by the generation units 101, a random pattern is generated. The random pattern generated at that time is a pattern having a larger scale than that of the pattern generated by the ink containing fine particles such as metal powder or glass powder. Accordingly, as it is possible to extract the feature quantity for individual identification from an image captured at low magnification, an inexpensive camera device can be used. Further, in order to use an ink containing no fine particles such as metal powder or glass powder, the mechanism of an inkjet or a pen itself or the maintenance thereof becomes inexpensive.

In general, an image of a pattern in an unstable state is not completely identical to but different from an image of the pattern in the subsequent stable state. Therefore, if an image of a pattern in an unstable state is used for individual identification of an object, accuracy of individual identification is degraded. However, according to the present embodiment, the imaging unit 102 acquires an image of a pattern after the pattern generated by the generation unit 101 is stabilized. Therefore, according to the present embodiment, it is possible to prevent an image of a pattern in an unstable state from being acquired. Thereby, accuracy of individual identification can be enhanced.

Further, by allowing the generation units 101 and the imaging unit 102 to be associated with each other, it is possible to make settings optimum such as an appropriate ratio, focusing, lighting, photographing distance, and exposure, with respect to the pattern during imaging. Therefore, timely adjustment is unnecessary, and imaging errors can be prevented.

Second Exemplary Embodiment

Figure 15:
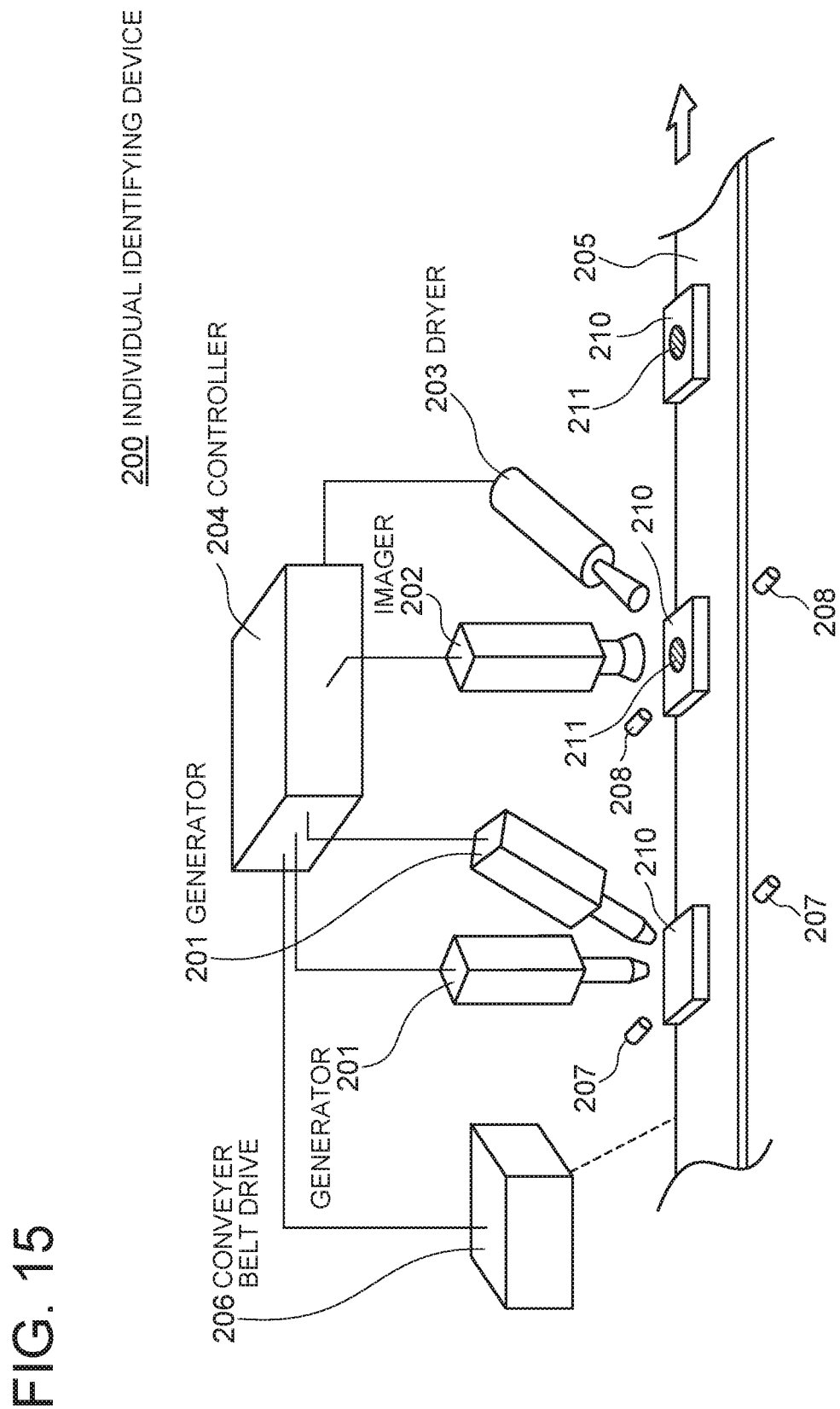
FIG. 15 is a diagram illustrating an exemplary configuration of an individual identifying device according to a second exemplary embodiment of the present invention.

Referring to FIG. 15, an individual identifying device 200 according to a second exemplary embodiment of the present invention performs generation of a pattern 211 on an object 210 and acquisition of an image of the pattern 211 for each feed pitch on the upper surface of a conveyor belt 205. The object 210 and the pattern 211 are the same as the object 110 and the pattern 111 illustrated in FIG. 1. The conveyor belt 205 is also referred to as a conveyance path.

The individual identifying device 200 includes two generators 201, an imager 202, a dryer 203, a controller 204, a conveyor belt drive 206, and optical switches 207 and 208. In this example, the number of generators is two. However, three or more generation units may be used. The two generators 201 and the imager 202 are disposed above the conveyor belt 205 with intervals in the longitudinal direction of the conveyor belt 205.

The conveyor belt drive 206 is configured of a stepping motor for pitch-feeding the conveyor belt 205, or the like. The optical switch 207 is a sensor that detects whether or not the object 211 is present on the conveyor belt 205 immediately below the generator 201. The optical switch 208 is a sensor that detects whether or not the object 211 is present on the conveyor belt 205 immediately below the imager 202.

The two generators 201 form a unit that generates a pattern 211 with respect to the object 210 on the conveyor belt 205 which is positioned immediately below the two generators 201. Each of the two generators 201 can be realized by the generation unit 101 as illustrated in FIG. 5 using the ink supply units 131 and 141 as illustrated in FIG. 2 or 3, for example. In that case, the ink supply units 152 of the two generators 201 are mounted while being angled to each other so as to be able to apply the ink to almost the same positions of the object on the conveyor belt 205. For example, one of the ink supply units 152 is mounted such that the nib portion or the ink-jet nozzle extends vertically, and the other one of the ink application units 152 is mounted such that the nib portion or the ink-jet nozzle extends at an angle that is slightly close to horizontal than vertical.

The dryer 203 is a unit that facilitates drying of the pattern 211. The dryer 203 is mounted so as to be able to blow hot air to the pattern 211 of the object 210 on the conveyor belt 205 which is positioned immediately below the imager 202. The dryer 203 may blow cold air rather than hot air. Also, the dryer 203 may be configured to emit ultraviolet light.

The imager 202 is a unit that determines whether or not the pattern 211 of the object 210 on the conveyor belt 205 positioned immediately below the imager 202 is stabilized, and acquires an image of the pattern 211 after it is stabilized. The imager 202 is also a unit that extracts the feature amount for individual identification from the acquired image of the pattern 211, and outputs it to the controller 204.

The controller 204 is a unit that controls the entire individual identifying device 200. The controller 204 is connected with the two generators 201, the imager 202, the dryer 203, the conveyor belt drive 206, and the optical sensors 207 and 208 in a wired or wireless manner, and transmits a command thereto to thereby control the operations thereof, or receives a signal therefrom.

Figure 16:
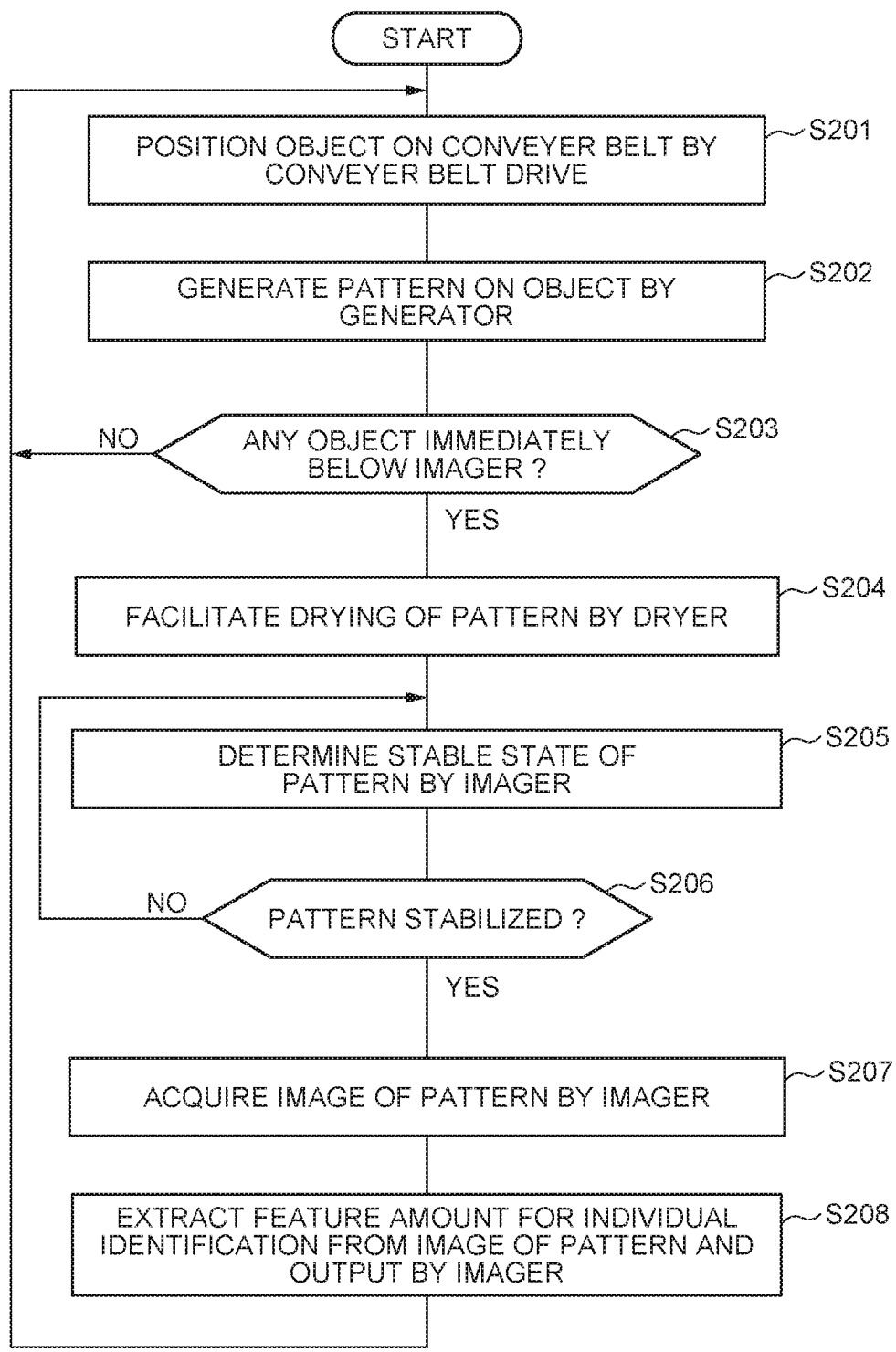
FIG. 16 is a flowchart illustrating a procedure of an individual identifying method performed using the individual identifying device according to the second exemplary embodiment of the present invention.

FIG. 16 is a flowchart illustrating an exemplary operation in an individual identifying method performed by the individual identifying device 200. Hereinafter, the individual identifying method according to the present embodiment will be described with reference to FIG. 16.

On the conveyor belt 205, a plurality of objects 210 are placed with a pitch that is equal to the intervals between the two generators 201 and the imager 202. The controller 204 issues a command to the conveyor belt drive 206 to drive the conveyor belt 205 by one pitch to thereby position one object 210 on the conveyor belt 205 immediately below the two generators 201 (S201). The fact that the object 210 is positioned on the conveyor belt 205 immediately below the two generators 201 is detected by the optical switch 207. At this time, the object 210 that has been present immediately below the two generators 201 moves to a position immediately below the imager 202 in a state where the pattern 211 is generated. The fact that the object 210 is positioned on the conveyor belt 205 immediately below the imager 202 is detected by the optical switch 208.

Next, the controller 204 issues a command to the two generators 201 to thereby allow generation of the pattern 211 with respect to the object 210 on the conveyor belt 205 immediately below the two generators 201 (S202). Specifically, in the case of using the generation unit 101 illustrated in FIG. 5 as the generator 201, the piston rod 154 is stroked downward by the drive unit 155 to thereby lower the ink supply unit 152 from the standby position to the ink supply position. Thereby, in the case where the ink supply unit 152 is of the pen type as illustrated in FIG. 2 or 4, the nib portion 123 abuts against the surface of the object 210 on the conveyor belt 205 and the ink is supplied to the surface of the object 210. In the case where the ink supplying unit 152 is of the ink-jet type as illustrated in FIG. 3, the tip end portion of the ink-jet nozzle 142 is positioned at a height appropriate for jetting the ink. When the ink is jetted from the position, the ink is supplied to the surface of the object 210 on the conveyor belt 205. Then, the piston rod 154 is raised by the drive unit 155, whereby the ink supply unit 152 is raised to the standby position. In order to prevent the tip portions of the ink supply units of the two generators 201 from interfering with each other, a time difference may be given to the motion of the two generators 201.

Next, the controller 204 detects whether or not the object 210 in which the pattern is generated is present immediately below the imager 202 at that point (S203). For example, the controller 204 determines that the object 210 in which a pattern is generated is present immediately below the imager 202 when the object 210 is detected at a position immediately below the imager 202 by the optical sensor 208, and the object 210 has been detected at a position immediately below the generator 201 by the optical sensor 207 before being moved by one pitch and a command of generating a pattern has been transmitted to the generator 201. Next, when the object 210 is not present immediately below the imager 202 at that point of time (S203), the controller 204 returns to the processing of step S201. Meanwhile, when the object 210 is present immediately below the imager 202 at that point of time (S203), the controller 204 first issues a command to the dryer 203 to allow hot air to be blown to the pattern 211 generated on the object 210 on the conveyor belt 205 immediately below the imager 202 (step S204).

Next, the controller 204 issues a command to the imager 202 to thereby first determine whether or not the pattern 211 generated on the object 210 on the conveyor belt 205 immediately below the imager 202 is stabilized (S205). Next, when determining that the pattern 211 is stabilized (S206), the controller 204 issues a command to the imager 202 to acquire an image of the pattern 211 generated on the object 210 on the conveyor belt 205 immediately below the imager 202 (S207). Next, the controller 204 issues a command to the imager 202 to extract the feature amount for individual identification from the acquired image of the pattern 211 and output it to an external server device not illustrated or store it in the database (S208). Then, the process returns to step S201. Determination of whether or not the pattern is stabilized at step S205, acquisition of an image of the pattern at step S206, and extraction of the feature amount for individual identification at step S207 are performed by a method similar to that described in the first exemplary embodiment.

As described above, according to the present embodiment, it is possible to perform processing such as generation of a pattern, drying of the pattern, acquisition of an image of the pattern for each feeding pitch on the upper surface of the conveyor belt 205.

According to the present embodiment, as stabilization of the pattern 211 generated on the object 210 is facilitated by the dryer 203, it is possible to increase the number of objects that can be processed per unit time as compared with the case of natural drying.

Third Exemplary Embodiment

Figure 17:
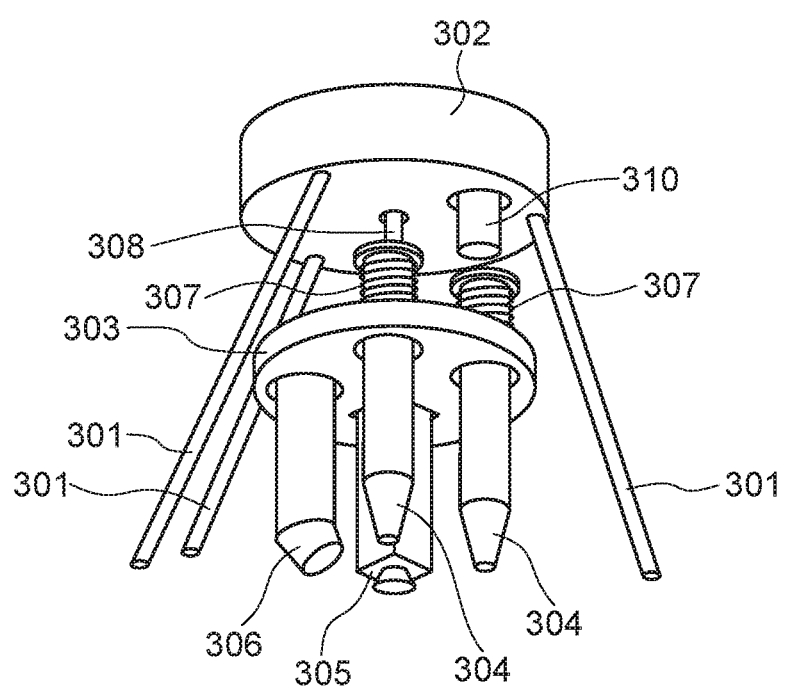
FIG. 17 is an external perspective view of an individual identifying device, when viewed from an obliquely lower side, according to a third exemplary embodiment of the present invention.
Figure 18:
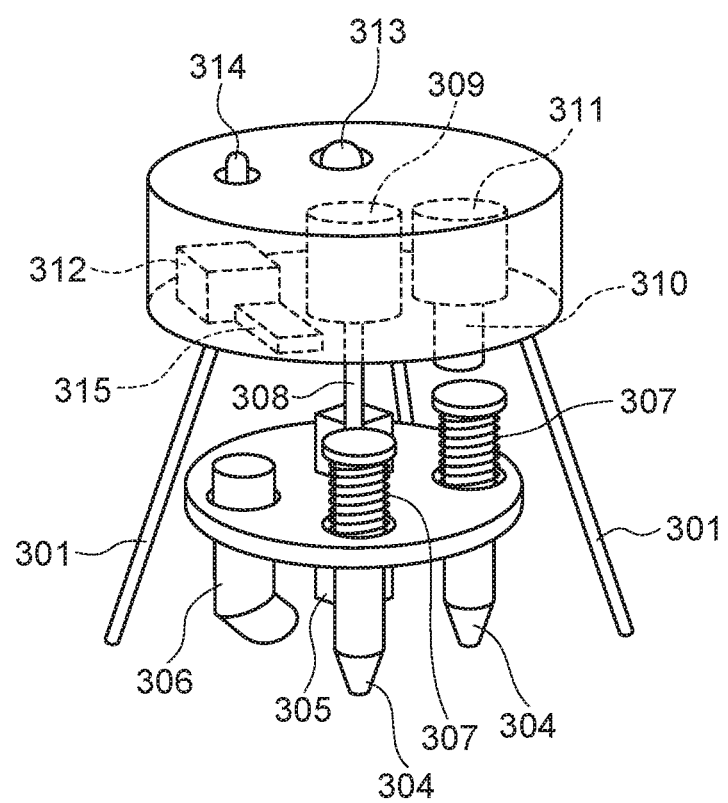
FIG. 18 is an external perspective view of the individual identifying device, when viewed from an obliquely upper side, according to the third exemplary embodiment of the present invention.

Referring to FIGS. 17 and 18, an individual identifying device 300 according to a third exemplary embodiment of the present invention is a portable individual identifying device that is compact and lightweight. The individual identifying device 300 includes an outer casing 302 of a hollow structure having three legs 301, a disk-shaped plate 303 provided rotatably relative to the outer casing 302, two ink supply units 304 mounted on the plate 303, an imager 305, and a dryer 306. As the two ink supply units 304, the ink supply unit as illustrated in FIGS. 2 to 4 may be used, for example. When the two ink supply units 304 are referred to in a distinguishable manner, they are referred to as a first ink supply unit 304 and a second ink supply unit 304.

The two ink supply units 304, the imager 305, and the dryer 306 are mounted with predetermined intervals in the circumferential direction in the outer peripheral portion of the plate 303. Specifically, the two ink supply units 304, the imager 305, and the dryer 306 are mounted detachably into a plurality of through holes provided with predetermined intervals in the circumferential direction in the outer peripheral portion of the plate 303. The dryer 306 is mounted so as to be able to blow hot air or the like to the pattern that is present immediately below the imager 305. Each of the two ink supply units 304 includes a return spring 307 that constantly applies upward elastic force to the ink supply unit 304. In a state where the outer casing 302 is disposed on a plane with use of the three legs 301, the length and the attachment angle of the three legs 301 are adjusted such that the lower ends of the two ink supply units 304, the imager 305, and the dryer 306 come to positions away from the plane by predetermined distances.

The outer casing 302 includes therein a stepping motor 309 connected to a rotary shaft 308 of the plate 303, a drive unit 311 that vertically moves a piston rod 310 of the cylinder, a controller 312 that controls the entire individual identifying device 300, and a battery 315 that supplies electric power to the respective units. The piston rod 310 of the drive unit 311 is mounted at a position away from the rotary shaft 308 by the same distance as the distance between the ink supply unit 304 and the rotary shaft 308. Further, on the upper surface of the outer casing 302, an operation button 313 and an LED 314 are provided.

The controller 204 is connected with the two ink supply units 304, the imager 305, the dryer 306, the stepping motor 309, the drive unit 311, the operation button 313, and the LED 314 by signal lines, and exchanges signals and commands with them to thereby control operation thereof and receives signals therefrom. The rotary shaft 308 may have a hollow structure, and the signal lines and the power lines connecting the controller 204 and the battery 315 and the two ink supply units 304, the imager 305, and the dryer 306 may be routed via the interior of the rotary shaft 308.

Figure 19:
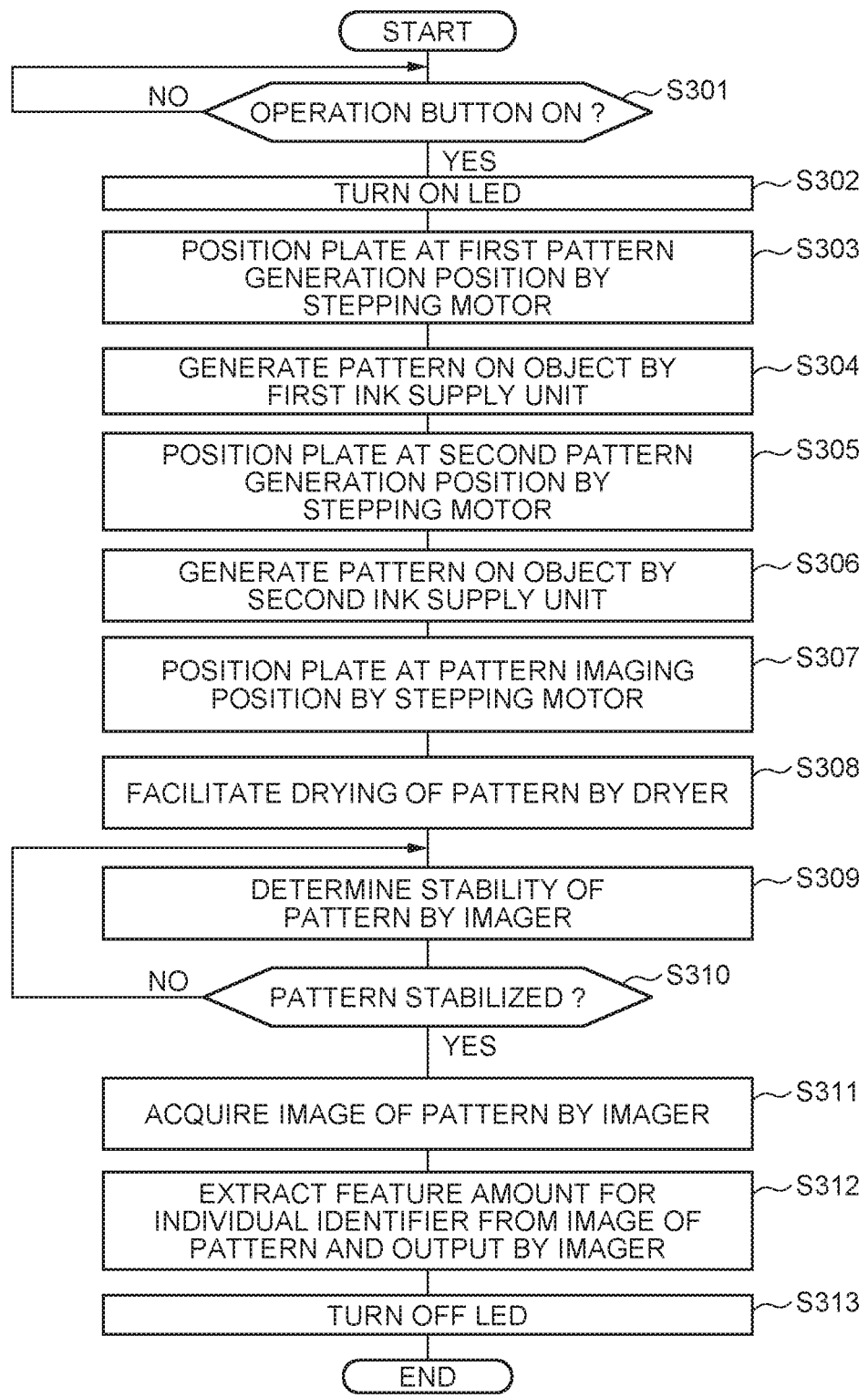
FIG. 19 is a flowchart illustrating a procedure of an individual identifying method performed using the individual identifying device according to the third exemplary embodiment of the present invention.

FIG. 19 is a flowchart illustrating an exemplary operation of an individual identifying method performed by the individual identifying device 300. Hereinafter, the individual identifying method according to the present embodiment will be described with reference to FIG. 19.

In the case of generating a pattern on an object, acquiring an image of the generated pattern, and extracting an individual identifier from the acquired image of the pattern, a user places the legs 301 of the outer casing 302 on a surface of the object for which a pattern is to be generated. Then, the user turns on the operation button 313.

When the operation button 313 is turned on (S301 in FIG. 19), the controller 312 turns on the LED 314 to inform the user that it is in operation (S302). Next, the controller 312 issues a command to the stepping motor 309 to position the plate 303 at a first pattern generation position (S303). The first pattern generation position is a position where a first ink supply unit 304 comes immediately below the piston rod 310. Next, the controller 312 generates a pattern on the object by the first ink supply unit 304 (S304). Specifically, the controller 312 issues a command to the drive unit 311 to lower the piston rod 310 by a predetermined amount. Thereby, the first ink supply unit 304 is pushed by the piston rod 310 and is lowered to the ink supply position against the elastic force of the return spring 307. Accordingly, when the first ink supply unit 304 is of the pen type as illustrated in FIG. 2 or 3, the nib portion 123 abuts against the surface of the object and the ink is supplied to the surface of the object. Further, in the case where the first ink supply unit 304 is of the ink-jet type as illustrated in FIG. 4, the tip end portion of the ink-jet nozzle 142 is positioned at a height appropriate for jetting the ink. When the ink is jetted from the ink-jet nozzle 142 according to a command from the controller 312, the ink is supplied to the surface of the object. When generation of a pattern by the first ink supply unit 304 is completed, the controller 312 issues a command to the drive unit 311 to raise the piston rod 310 to the original position. When the piston rod 310 is raised, the first ink supply unit 304 is raised by the elastic force of the return spring 307.

Next, the controller 312 issues a command to the stepping motor 309 to position the plate 303 at a second pattern generation position (S305). The second pattern generation position is a position where the second ink supply unit 304 comes immediately below the piston rod 310. Next, the control unit 312 generates a pattern on the object by the second ink supply unit 304, by the operation similar to the case of the first ink supply unit 304 (S306). That is, on the ink applied to the object by the first ink application unit 304, the second ink supply unit 304 applies the ink of a different color onto the object. When generation of the pattern by the second ink supply unit 304 is completed, the controller 312 issues a command to the drive unit 311 to raise the piston rod 310 to the original position. When the piston rod 310 is raised, the second ink supply unit 304 is raised by the elastic force of the return spring 307.

Next, the controller 312 issues a command to the stepping motor 309 to position the plate 303 at a pattern imaging position (S307). The pattern imaging position is a position where the imager 305 comes immediately below the piston rod 310. Next, the controller 312 blows hot air to the generated pattern by driving the dryer 306 (S308). Next, the controller 312 issues a command to the imager 305 to thereby determine whether or not the generated pattern is stabilized (S309). Next, when determining that the pattern is stabilized (S310), the controller 312 issues a command to the imager 305 to acquire an image of the generated pattern (S311). Next, the controller 312 issues a command to the imager 305 to extract the feature amount for individual identification from the acquired image of the pattern, output it to an external server device, and store it in the database (S312). Determination of whether or not the pattern is stabilized at step S309, acquisition of an image of the pattern at step S310, and extraction of the feature amount for individual identification at step S311 are performed by a method similar to that described in the first exemplary embodiment.

Next, the controller 312 turns off the LED 314 to inform the user that the operation is completed (S313). Then, the controller 312 ends the process of FIG. 19. It is also possible to have a configuration that before the end of the process of FIG. 19, the controller 312 issues a command to the stepping motor 309 to position the plate 303 at the first pattern generation position.

As described above, according to the present embodiment, it is possible to provide the portable individual identifying device 300 in which a pattern can be generated on an object with an easy operation regardless of time and place, and the feature amount for individual identification can be extracted from an image obtained by imaging the pattern.

Fourth Exemplary Embodiment

Figure 20:
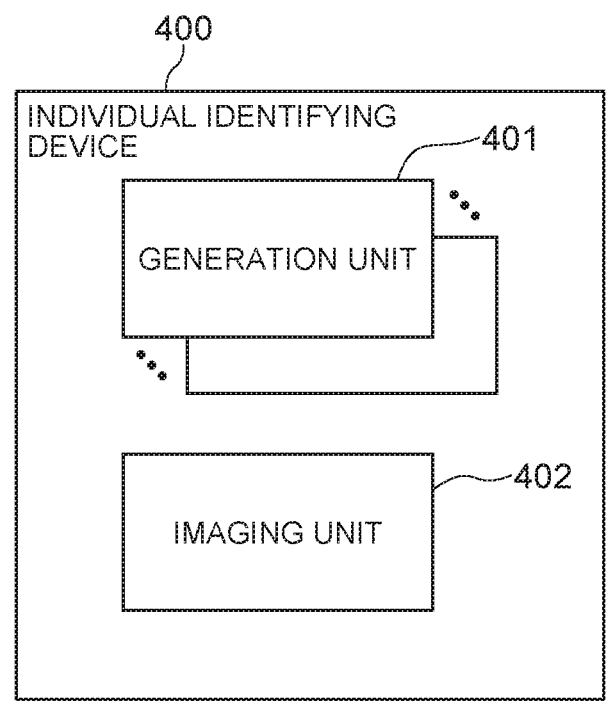
FIG. 20 is a diagram illustrating an exemplary configuration of an individual identifying device according to a fourth exemplary embodiment of the present invention.

Referring to FIG. 20, an individual identifying device 400 according to a fourth exemplary embodiment of the present invention includes a plurality of generation units 401 and an imaging unit 402.

The generation units 401 have a function of generating a pattern on an object. The generation units 401 may have a configuration similar to that of the generation unit 101 of FIG. 1, for example. However, it is not limited thereto.

The imaging unit 402 has a function of acquiring an image of a generated pattern, in conjunction with generation of the pattern by the generation units 401. The imaging unit 402 may have a configuration similar to that of the imaging unit 102 of FIG. 1, for example. However, it is not limited thereto. The imaging unit 402 may be implemented by the computer 500 including the arithmetic processing unit 501 and the storage unit 502 and the program 503 as illustrated in FIG. 21, besides a dedicated hardware. The program 503 is read by the computer 500 when the computer 500 is started or the like, and controls operation of the computer 500 to thereby implement the imaging unit 402 on the computer 500.

The Individual identifying device 400 according to the present embodiment configured as described above operates as described below. First, the generation units 401 generate a pattern on an object. Then, the imaging unit 402 acquires an image of the generated pattern, in conjunction with generation of the pattern.

As described above, the individual identifying device 400 according to the present embodiment acquires an image of a pattern in conjunction with generation of the pattern. Accordingly, it is possible to prevent occurrence of a discrepancy between generation of the pattern and acquisition of the image thereof.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to the field of generating a pattern for individual identification on the surface of industrial products and product packaging, capturing an image of the pattern, and extracting the feature amount for individual identification from the image.

The whole or part of the exemplary embodiments disclosed above can be described as, but not limited to, the following supplementary notes.
(Supplementary Note 1)
An individual identifying device comprising:
a plurality of generation units that generate a pattern on an object; and
an imaging unit that acquires an image of the pattern in conjunction with generation of the pattern.
(Supplementary Note 2)
The individual identifying device according to supplementary note 1, wherein the plurality of the generation units apply ink to almost same positions on the object.
(Supplementary Note 3)
The individual identifying device according to supplementary note 1 or 2, wherein the plurality of the generation units apply ink on the object almost simultaneously.
(Supplementary Note 4)
The individual identifying device according to any of supplementary notes 1 to 3, wherein
the plurality of the generation units apply a plurality of inks of different colors on the object.
(Supplementary Note 5)
The individual identifying device according to any of supplementary notes 1 to 4, wherein
the imaging unit acquires an image of the pattern after the pattern is stabilized.
(Supplementary Note 6)
The individual identifying device according to any of supplementary notes 1 to 5, wherein
the imaging unit includes a detection unit that detects whether or not the generation of the pattern was performed.
(Supplementary Note 7)
The individual identifying device according to any of supplementary notes 1 to 6, wherein
the imaging unit includes a determination unit that determines whether or not the pattern is stabilized.
(Supplementary Note 8)
The individual identifying device according to supplementary note 7, wherein
the determination unit performs the determination based on time-series images of the pattern obtained by imaging the pattern in a time series manner after the generation of the pattern.
(Supplementary Note 9)
The individual identifying device according to supplementary note 7, wherein
the determination unit performs the determination based on a result of comparing a number of feature points extracted from a plurality of images included in time-series images of the pattern obtained by imaging the pattern in a time-series manner after the generation of the pattern, with a reference value.
(Supplementary Note 10)
The individual identifying device according to supplementary note 9, wherein
the imaging unit acquires an image, among the plurality of the images, in which the number of the feature points is larger than the reference value, as an image after the pattern is stabilized.
(Supplementary Note 11)
The individual identifying device according to supplementary note 7, wherein
the determination unit performs the determination based on a result of comparing, with each other, pieces of information regarding the feature points extracted from the images constituting the time-series images of the pattern obtained by imaging the pattern in a time-series manner after the generation of the pattern.
(Supplementary Note 12)
The individual identifying device according to supplementary note 11, wherein
the imaging unit acquires, as an image after the pattern is stabilized, a temporally subsequent image from which information regarding a plurality of feature points is extracted, the information being almost same as information regarding a plurality of feature points extracted from a temporally preceding image.
(Supplementary Note 13)
The individual identifying device according to supplementary note 7, wherein
the determination unit performs the determination based on whether or not a predetermined time passed from the generation of the pattern.
(Supplementary Note 14)
The individual identifying device according to supplementary note 6, wherein
the detection unit detects a predetermined motion of the generation unit in order to perform the detection.

(Supplementary Note 15)

The individual identifying device according to supplementary note 6, wherein the detection unit detects a visual change in a predetermined region on the object through image recognition in order to perform the detection.

(Supplementary Note 16)

The individual identifying device according to supplementary note 7, wherein the detection unit exchanges a predetermined signal with the generation unit in order to perform the detection.

(Supplementary Note 17)

The individual identifying device according to any of supplementary notes 1 to 16, wherein the generation unit generates the pattern by applying ink on the object.

(Supplementary Note 18)

The individual identifying device according to any of supplementary notes 1 to 17, wherein the plurality of the generation units includes an inkjet or a pen.

(Supplementary Note 19)

The individual identifying device according to any of supplementary notes 1 to 18, wherein the plurality of the generation units and the imaging unit are arranged with intervals in a longitudinal direction of a conveying path for conveying the object, and are configured to perform the generation and the acquisition with respect to the object on the conveying path.

(Supplementary Note 20)

The individual identifying device according to any of supplementary notes 1 to 18, wherein the individual identifying device is configured such that a plate that movably supports the plurality of the generation units and the imaging unit is built in a portable outer casing, and that the imaging unit is moved to a position at which the pattern was generated by the plurality of the generation units to image the pattern.

(Supplementary Note 21)

An individual identifying method comprising:

generating a pattern on an object by a plurality of generation units; and acquiring an image of the pattern in conjunction with generation of the pattern.

(Supplementary Note 22)

The individual identifying method according to supplementary note 21, wherein the generating includes applying ink to almost same positions on the object by the plurality of the generation units.

(Supplementary Note 23)

The individual identifying method according to supplementary note 21 or 22, wherein the generating includes applying ink on the object almost simultaneously by the plurality of the generation units.

(Supplementary Note 24)

The individual identifying method according to any of supplementary notes 21 to 23, wherein the generating includes applying a plurality of inks of different colors on the object by the plurality of the generation units.

(Supplementary Note 25)

The individual identifying method according to any of supplementary notes 21 to 24, wherein the acquiring includes acquiring an image of the pattern after the pattern is stabilized.

(Supplementary Note 26)

The individual identifying method according to any of supplementary notes 21 to 25, further comprising before the acquiring, detecting whether or not the generation of the pattern was performed.

(Supplementary Note 27)

The individual identifying method according to any of supplementary notes 21 to 26, further comprising before the acquiring, determining whether or not the pattern is stabilized.

(Supplementary Note 28)

The individual identifying method according to supplementary note 27, wherein the determining is performed based on time-series images of the pattern obtained by imaging the pattern in a time series manner after the generation of the pattern.

(Supplementary Note 29)

The individual identifying method according to supplementary note 27, wherein the determining is performed based on a result of comparing a number of feature points extracted from a plurality of images included in time-series images of the pattern obtained by imaging the pattern in a time-series manner after the generation of the pattern, with a reference value.

(Supplementary Note 30)

The individual identifying method according to supplementary note 29, wherein the acquiring includes acquiring an image, among the plurality of the images, in which the number of the feature points is larger than the reference value, as an image after the pattern is stabilized.

(Supplementary Note 31)

The individual identifying method according to supplementary note 27, wherein the determining is performed based on a result of comparing, with each other, pieces of information regarding the feature points extracted from the images constituting the time-series images of the pattern obtained by imaging the pattern in a time-series manner after the generation of the pattern.

(Supplementary Note 32)

The individual identifying method according to supplementary note 31, wherein the acquiring includes acquiring, as an image after the pattern is stabilized, a temporally subsequent image from which information regarding a plurality of feature points is extracted, the information being almost same as information regarding a plurality of feature points extracted from a temporally preceding image.

(Supplementary Note 33)

The individual identifying method according to supplementary note 27, wherein the determining is performed based on whether or not a predetermined time passed from the generation of the pattern.

(Supplementary Note 34)

The individual identifying method according to supplementary note 26, further comprising, detecting a motion of generating the pattern on the object by a generation unit, in order to perform the detection.

(Supplementary Note 35)

The individual identifying method according to supplementary note 26, further comprising detecting a visual change in a predetermined region on the object through image recognition in order to perform the detection.

(Supplementary Note 36)
The individual identifying method according to supplementary note 27, further comprising
exchanging a predetermined signal with a generation unit that generates the pattern on the object in order to perform the detection.

(Supplementary Note 37)
The individual identifying method according to any of supplementary notes 21 to 36, wherein
the generating includes generating the pattern by applying ink on the object.

(Supplementary Note 38)
The individual identifying method according to any of supplementary notes 21 to 37, wherein
the generating includes generating the pattern with use of a plurality of inkjets or pens.

(Supplementary Note 39)
The individual identifying method according to any of supplementary notes 21 to 38, wherein
the generating and the acquiring are performed with respect to the object on a conveying path with use of a plurality of generation units and an imaging unit that are arranged with intervals in a longitudinal direction of the conveying path for conveying the object.

(Supplementary Note 40)
The individual identifying method according to any of supplementary notes 21 to 38, further comprising
placing a portable outer casing incorporating, in the portable outer casing, a plate that movably supports a generation unit and an imaging unit on the object, and after generating the pattern on the object by the plurality of the generation units, moving the imaging unit to a position at which the pattern was generated and imaging the pattern.

(Supplementary Note 41)
A program for causing a computer to function as an imaging unit that acquires an image of a pattern in conjunction with generation of the pattern on an object.

REFERENCE SIGNS LIST 100 individual identifying device
101 generation unit
102 imaging unit
110 object
111 pattern
121 ink supply unit
122 housing
123 nib portion
124 ink
125 ink
126 partition wall
127 cap
131 ink supply unit
141 ink supply unit
142 ink-jet nozzle
143 drive unit
144 ink tank
151 plate
152 ink supply unit
153 return spring
154 piston rod
155 drive unit
156 limit switch
161 camera
162 detection unit
163 determination unit
164 image processing unit
171 image acquisition unit
172 feature point extraction unit
173 local feature amount calculation unit
174 reference value storing unit
175 feature point storing unit
176 local feature amount storing unit
177 comparison unit
178 collation unit
179 collation unit
180 determination result output unit
181 timer
191 image acquisition unit
192 feature point extraction unit
193 local feature amount calculation unit
194 local feature amount output unit
200 individual identifying device
201 generator
202 imager
203 dryer
204 controller
205 conveyor belt
206 conveyor belt drive
210 object
211 pattern
300 individual identifying device
301 leg
302 outer casing
303 plate
304 ink supply unit
305 imager
306 dryer
307 return spring
308 rotary shaft
309 stepping motor
310 piston rod
311 drive unit
312 controller
313 operation button
314 LED
315 power source
400 individual identifying device
401 generation unit
402 imaging unit

The invention claimed is:
1. An individual identifying device comprising:
a first pen or inkjet for applying first ink on an object;
a second pen or inkjet for applying second ink so as to overlap with at least part of a region to which the first ink is applied on the object before the first ink having been applied dries completely, ink color of the second ink being different from ink color of the first ink;
a camera that acquires an image of a pattern generated on the object by the first ink and the second ink, at certain time intervals; and
at least one processor configured to extract feature points from the image of the pattern, compare a number of the extracted feature points with a reference value, determine that the pattern is stabilized when the number of the feature points is larger than the reference value, and extract a local feature amount for individual identification from the stabilized pattern.
2. An individual identifying method comprising:
applying first ink on an object;
applying second ink so as to overlap with at least part of a region to which the first ink is applied on the object before the first ink having been applied dries completely, ink color of the second ink being different from ink color of the first ink;

acquiring an image of a pattern generated on the object by the first ink and the second ink, at certain time intervals;

extracting feature points from the acquired image of the pattern;

comparing a number of the extracted feature points with a reference value, and determining that the pattern is stabilized when the number of the feature points is larger than the reference value; and extracting a local feature amount for individual identification from the stabilized pattern.

3. A non-transitory computer readable medium storing a program comprising instructions for causing a computer to execute processing of:

applying first ink on an object, applying second ink so as to overlap with at least part of a region to which the first ink is applied on the object before the first ink having been applied dries completely, ink color of the second ink being different from ink color of the first ink, and acquiring an image of a pattern generated on the object by the first ink and the second ink, at certain time intervals;

extracting feature points from the acquired image of the pattern;

comparing a number of the extracted feature points with a reference value, and determining that the pattern is stabilized when the number of the feature points is larger than the reference value; and extracting a local feature amount for individual identification from the stabilized pattern.

* * * * *